US009084705B2

(12) United States Patent
Jaenke et al.

(10) Patent No.: US 9,084,705 B2
(45) Date of Patent: *Jul. 21, 2015

(54) METHOD AND APPARATUS FOR SETTING OR MODIFYING PROGRAMMABLE PARAMETERS IN POWER DRIVEN WHEELCHAIR

(71) Applicant: Invacare Corporation, Elyria, OH (US)

(72) Inventors: Bruce A. Jaenke, Parma, OH (US); Darryl Peters, Elyria, OH (US); Gary E. Chopcinski, North Ridgeville, OH (US); Ricky J. McCullar, Olmsted Township, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,614

(22) Filed: Aug. 26, 2013

(65) Prior Publication Data

US 2014/0058582 A1 Feb. 27, 2014

Related U.S. Application Data

(60) Continuation of application No. 13/646,989, filed on Oct. 8, 2012, now abandoned, which is a continuation of application No. 13/228,677, filed on Sep. 9, 2011, now Pat. No. 8,285,440, which is a division of (Continued)

(51) Int. Cl.
*G06F 7/00* (2006.01)
*G06F 17/00* (2006.01)
(Continued)

(52) U.S. Cl.
CPC .. *A61G 5/10* (2013.01); *A61G 5/04* (2013.01); *G05B 19/106* (2013.01);
(Continued)

(58) Field of Classification Search
USPC .................. 701/1, 36; 180/65.1, 907; 280/29, 280/250.1, 304.1, 304.2
See application file for complete search history.

(56) References Cited

U.S. PATENT DOCUMENTS 1,114,948 A 10/1914 Walker
2,759,525 A 8/1956 Reis
(Continued)

FOREIGN PATENT DOCUMENTS

DE 3923937 1/1990
EP 0345785 12/1989
(Continued)

OTHER PUBLICATIONS

Notice of Allowance from U.S. Appl. No. 11/513,750 dated Oct. 12, 2011.

(Continued)

*Primary Examiner* — Yonel Beaulieu
(74) *Attorney, Agent, or Firm* — Calfee, Halter & Griswold LLP

(57) ABSTRACT

A collection of diagnostic and troubleshooting information associated with a power driven wheelchair is stored for access by a microcontroller to be displayed to a user to assist in troubleshooting the power driven wheelchair. A log of fault codes transmitted by various fault-detecting mechanisms is compiled. A user may request display of diagnostic information associated with a selected fault code. The operating instructions of a power driven wheelchair may be updated by using portable storage media onto which a latest version of operating instructions is loaded to transfer the updated operating instructions to wheelchair controller memory. The calibration of a power driven wheelchair can be simplified by providing functionality within the wheelchair controller to change calibration parameters or to transfer calibration parameters from portable storage media.

22 Claims, 36 Drawing Sheets

Related U.S. Application Data application No. 11/513,750, filed on Aug. 31, 2006, now Pat. No. 8,073,585.

(60) Provisional application No. 60/712,987, filed on Aug. 31, 2005, provisional application No. 60/727,005, filed on Oct. 15, 2005, provisional application No. 60/726,983, filed on Oct. 15, 2005, provisional application No. 60/726,666, filed on Oct. 15, 2005, provisional application No. 60/726,981, filed on Oct. 15, 2005, provisional application No. 60/726,993, filed on Oct. 15, 2005, provisional application No. 60/727,249, filed on Oct. 15, 2005, provisional application No. 60/727,250, filed on Oct. 15, 2005.

(51) Int. Cl.
| | |
|---|---|
| *B60K 1/00* | (2006.01) |
| *A61G 5/10* | (2006.01) |
| *A61G 5/04* | (2013.01) |
| *G05B 19/10* | (2006.01) |
| *H02P 21/14* | (2006.01) |
| *A61G 5/12* | (2006.01) |
| *A61G 7/057* | (2006.01) |

(52) U.S. Cl.
CPC ............ *H02P 21/146* (2013.01); *A61G 5/1059* (2013.01); *A61G 5/1075* (2013.01); *A61G 5/12* (2013.01); *A61G 2005/1089* (2013.01); *A61G 2005/128* (2013.01); *A61G 2007/05784* (2013.01); *A61G 2203/14* (2013.01); *A61G 2203/20* (2013.01); *B60Y 2200/84* (2013.01); *G05B 2219/23128* (2013.01); *G05B 2219/23129* (2013.01); *G05B 2219/23159* (2013.01); *G05B 2219/23193* (2013.01); *G05B 2219/23332* (2013.01); *G05B 2219/23388* (2013.01); *G05B 2219/2637* (2013.01); *Y02T 10/643* (2013.01); *Y02T 10/7258* (2013.01)

(56) References Cited

U.S. PATENT DOCUMENTS

| | | | |
|---|---|---|---|
| 3,454,305 A | 7/1969 | Gilmour | |
| 4,207,959 A | 6/1980 | Youdin et al. | |
| 4,736,921 A | 4/1988 | Zane et al. | |
| 4,779,884 A | 10/1988 | Minati | |
| 4,951,766 A | 8/1990 | Basedow et al. | |
| 5,033,000 A | 7/1991 | Littlejohn et al. | |
| 5,157,768 A | 10/1992 | Hoeber et al. | |
| 5,187,797 A | 2/1993 | Nielsen et al. | |
| 5,197,559 A | 3/1993 | Garin et al. | |
| 5,234,066 A | 8/1993 | Ahsing et al. | |
| 5,245,558 A | 9/1993 | Hachey | |
| 5,248,007 A | 9/1993 | Watkins et al. | |
| 5,261,715 A | 11/1993 | Blatt et al. | |
| 5,299,824 A | 4/1994 | Roberts et al. | |
| 5,516,021 A | 5/1996 | Douglass | |
| 5,547,038 A | 8/1996 | Madwed | |
| 5,555,949 A | 9/1996 | Stallard et al. | |
| 5,647,520 A | 7/1997 | McDaid | |
| 5,718,442 A | 2/1998 | Alexander et al. | |
| 5,794,730 A | 8/1998 | Kamen | |
| 5,817,137 A | 10/1998 | Kaemmerer | |
| 5,899,526 A | 5/1999 | LaPointe et al. | |
| 5,961,561 A | 10/1999 | Wakefield | |
| 6,068,280 A | 5/2000 | Torres | |
| 6,152,246 A | 11/2000 | King et al. | |
| 6,154,690 A | 11/2000 | Coleman | |
| 6,170,598 B1 | 1/2001 | Furukawa | |
| 6,290,011 B1 | 9/2001 | Langaker et al. | |
| 6,354,390 B1 | 3/2002 | Uchiyama et al. | |
| 6,409,265 B1 | 6/2002 | Koerlin et al. | |
| 6,425,635 B1 | 7/2002 | Pulver | |
| 6,588,792 B1 | 7/2003 | Koerlin et al. | |
| 6,688,571 B1 | 2/2004 | Pauls | |
| 6,715,784 B2 | 4/2004 | Koerlin et al. | |
| 6,816,762 B2 | 11/2004 | Hensey et al. | |
| 6,819,981 B2 | 11/2004 | Wakefield, II et al. | |
| 6,832,745 B2 | 12/2004 | Lindsay | |
| 6,842,692 B2 | 1/2005 | Fehr et al. | |
| 6,866,107 B2 | 3/2005 | Heinzmann et al. | |
| 6,868,931 B2 | 3/2005 | Morrell et al. | |
| 6,871,122 B1 | 3/2005 | Wakefield, II | |
| 6,874,591 B2 | 4/2005 | Morrell et al. | |
| 6,926,106 B2 | 8/2005 | Richey, II et al. | |
| 6,938,923 B2 | 9/2005 | Mulhern et al. | |
| 6,974,194 B2 | 12/2005 | Schreiber et al. | |
| 6,976,699 B2 | 12/2005 | Koerlin | |
| 6,989,642 B2 | 1/2006 | Wakefield, II et al. | |
| 6,991,292 B2 | 1/2006 | Kasten | |
| 7,003,381 B2 | 2/2006 | Wakefield, II | |
| 7,083,019 B2 | 8/2006 | Chiou et al. | |
| 7,113,854 B2 | 9/2006 | Mansell et al. | |
| 7,148,638 B2 | 12/2006 | Wakefield, II | |
| 7,159,181 B2 | 1/2007 | Mansell et al. | |
| 7,171,288 B2 | 1/2007 | Wakefield, II | |
| 7,246,856 B2 | 7/2007 | Kruse et al. | |
| 7,262,762 B2 | 8/2007 | McAlindon | |
| 7,296,312 B2 | 11/2007 | Menkedick et al. | |
| 7,310,776 B2 | 12/2007 | Mansell et al. | |
| 7,374,679 B2 | 5/2008 | Huang et al. | |
| 7,403,844 B2 | 7/2008 | Chopcinski et al. | |
| 7,461,897 B2 | 12/2008 | Kruse et al. | |
| 7,635,164 B2 | 12/2009 | Torres et al. | |
| 7,668,634 B2 | 2/2010 | Mansell et al. | |
| 8,065,051 B2 | 11/2011 | Chopcinski et al. | |
| 8,073,585 B2 * | 12/2011 | Jaenke et al. | 701/31.6 |
| 8,073,588 B2 | 12/2011 | Peters et al. | |
| 8,127,875 B2 | 3/2012 | Mattes | |
| 8,145,373 B2 | 3/2012 | Jaenke | |
| 8,285,440 B2 | 10/2012 | Jaenke | |
| 8,315,753 B2 | 11/2012 | Meyer | |
| 8,437,899 B2 | 5/2013 | Jaenke et al. | |
| 8,646,551 B2 | 2/2014 | Mattes | |
| 8,793,032 B2 | 7/2014 | Peters et al. | |
| 2002/0008718 A1 | 1/2002 | Obradovich | |
| 2002/0173993 A1 | 11/2002 | Skulason et al. | |
| 2003/0001875 A1 | 1/2003 | Black | |
| 2003/0109973 A1 | 6/2003 | Hensey et al. | |
| 2003/0120601 A1 | 6/2003 | Ouye et al. | |
| 2003/0127261 A1 | 7/2003 | Borroni-Bird et al. | |
| 2004/0002305 A1 | 1/2004 | Byman-Kivivuori et al. | |
| 2004/0085295 A1 | 5/2004 | Cowen | |
| 2004/0252341 A1 | 12/2004 | Adachi et al. | |
| 2004/0259591 A1 | 12/2004 | Grams et al. | |
| 2005/0062726 A1 | 3/2005 | Marsden et al. | |
| 2005/0107925 A1 | 5/2005 | Enigk et al. | |
| 2005/0195173 A1 | 9/2005 | McKay | |
| 2005/0236196 A1 | 10/2005 | Runkles et al. | |
| 2005/0236208 A1 | 10/2005 | Runkles et al. | |
| 2005/0236217 A1 | 10/2005 | Koerlin et al. | |
| 2007/0050096 A1 | 3/2007 | Mattes et al. | |
| 2007/0050111 A1 | 3/2007 | Mattes et al. | |
| 2007/0055424 A1 | 3/2007 | Peters et al. | |
| 2007/0056780 A1 | 3/2007 | Jaenke et al. | |
| 2007/0056781 A1 | 3/2007 | Mattes et al. | |
| 2007/0056782 A1 | 3/2007 | Chopcinski et al. | |
| 2007/0074917 A1 | 4/2007 | Jaenke et al. | |
| 2007/0080003 A1 | 4/2007 | Koerlin et al. | |
| 2008/0030463 A1 | 2/2008 | Forest | |
| 2008/0249694 A1 | 10/2008 | Jaenke et al. | |
| 2009/0121532 A1 | 5/2009 | Kruse et al. | |
| 2009/0153370 A1 | 6/2009 | Cooper et al. | |
| 2010/0082182 A1 | 4/2010 | Griggs et al. | |
| 2012/0064502 A1 | 3/2012 | Chopcinski | |
| 2012/0166020 A1 | 6/2012 | Mattes | |

(56) References Cited

U.S. PATENT DOCUMENTS

2014/0005852 A1 2/2014 Jaenke
2014/0067158 A1 3/2014 Peters et al.

FOREIGN PATENT DOCUMENTS

| | | |
|---|---|---|
| EP | 0436103 | 7/1991 |
| EP | 1148394 | 10/1991 |
| GB | 2222701 | 3/1990 |
| JP | 2008-194183 | 8/2008 |
| JP | 2009-261472 | 1/2009 |
| JP | 2009-078028 | 4/2009 |
| JP | 2010-017354 | 1/2010 |
| WO | 2003034967 | 5/2003 |
| WO | 04/036390 | 4/2004 |
| WO | 2005032924 | 4/2005 |
| WO | 2005037168 | 4/2005 |
| WO | 2005039473 | 5/2005 |
| WO | 2005039930 | 5/2005 |

OTHER PUBLICATIONS

Response from European Application No. 06813984.9 dated Dec. 18, 2012.
Ex Parte Quayle Action for U.S. Appl. No. 13/646,989 dated Jun. 27, 2013.
Response to Office Action for U.S. Appl. No. 13/311,140 dated Apr. 10, 2013.
Notice of Allowance from U.S. Appl. No. 13/311,140 dated May 15, 2013.
Response to Office Action for U.S. Appl. No. 13/412,034 dated Jun. 18, 2013.
Response to Office Action in AU Application No. 2006284753 dated Feb. 27, 2013.
2nd Office Action from EP Appl. No. 06814005.2 dated May 21, 2013 (received Jul. 4, 2013).
Office Action for U.S. Appl. No. 13/301,051 dated May 9, 2013.
Amendment to Office Action for U.S. Appl. No. 13/301,051 dated Aug. 9, 2013.
Final Office Action for U.S. Appl. No. 13/301,051 dated Aug. 29, 2013.
Non Final Office Action for U.S. Appl. No. 13/301,061 dated Jul. 19, 2013.
Office Action in EP Application No. 06802770.5 dated Jul. 1, 2013.
Response to Office Action in CA Application No. 2,614,744 dated Aug. 1, 2013.
Amendment in CA Application No. 2,615,091 dated Jul. 30, 2013.
Amendment in CA Application No. 2,616,325 dated Aug. 6, 2013.
Response to Office Action in CA Application No. 2,616,332 dated Aug. 6, 2013.
Response to Office Action in CA Application No. 2,615,087 dated Aug. 6, 2013.
Response from U.S. Appl. No. 13/301,051 dated Oct. 28, 2013.
Interview Summary from U.S. Appl. No. 13/031,051 dated Nov. 7, 2013.
Response from U.S. Appl. No. 13/031,061 dated Oct. 21, 2013.
Office action from U.S. Appl. No. 13/031,061 dated Nov. 5, 2013.
Notice of Allowance from U.S. Appl. No. 13/412,034 dated Sep. 30, 2013.
Office action from Canadian Application No. 2,614,744 dated Nov. 19, 2013.
Office action from Canadian Application No. 2,615,087 dated Sep. 20, 2013.
Office action from Canadian Application No. 2,616,325 dated Nov. 22, 2013.
Response from European Application No. 06813984.9 dated Nov. 4, 2013.
Response from European Application No. 06802770.5 dated Nov. 11, 2013.
Office action from European Application No. 06813984.9 dated Apr. 25, 2013.
Response to Office action from Australian Application No. 2006284741 dated May 17, 2012.
First Office action from EP Application No. 06814005.2 dated Nov. 2, 2011.
Response from EP Application No. 06814005.2 dated May 4, 2012.
Supplemental Amendment from U.S. Appl. No. 13/288,677 dated May 30, 2012.
Office action for U.S. Appl. No. 13/311,140 dated Jan. 10, 2013.
Response from U.S. Appl. No. 13/301,061 dated Mar. 5, 2014.
Office action from U.S. Appl. No. 13/301,061 dated Mar. 27, 2014.
Response from U.S. Appl. No. 13/301,061 dated Jun. 26, 2014.
Office action from U.S. Appl. No. 13/301,061 dated Aug. 06, 2014.
Comments on Statement of Reasons for Allowance from U.S. Appl. No. 13/311,140 dated Aug. 13, 2013.
Notice of Allowance from U.S. Appl. No. 13/311,140 dated Mar. 31, 2014.
Response from European Application No. 06813991.4 dated Aug. 21, 2014.
Office action from U.S. Appl. No. 13/975,614 dated Apr. 30, 2014.
Response from Canadian U.S. Appl. No. 2,616,325 dated May 22, 2014.
Office action from Canadian U.S. Appl. No. 2,616,325 dated Jul. 14, 2014.
Office action from European Application No. 06813984.9 dated Apr. 30, 2014.
Office action from European Application No. 06813991.4 dated Feb. 24, 2014.
Asakawa et al., "Experiment on operating methods of an electric wheelchair for a system of detecting position and direction", Robotics and Biomimetics, ROBIO 2007, IEEE Int'l Conf on Digital Object Identifier, 10.1109/ROBIO.2007.4522345, pp. 1260-1265 (2007).
Barea, R., et al., "EOG guidance of a wheelchair using nerual networks", Proceedings 15th Intl Conf. on Pattern Recognition, vol. 4, Digital Object Identifier 10.1109/ICPR.2000.903006, pp. 668-671, published 2000.
Cooper et al., "Analysis of position and isometric joysticks for powered wheelchair driving", Biomedical Engineering, IEEE Transactions on Digital Object Identifier, vol. 47, issue 7, 10.1109/10.846684, published 2000, pp. 902-910.
Jones et al., "Powered wheelchair driving performance using force- and position-sensing joysticks", Bioengineering Conference, Proceedings of the IEEE 24th Annual Northeast, Digital Object identifier, 10.1109/NEBC.1998.664901, pp. 130-132, published 1998.
Katsura et al., "Semiautonomous wheelchair based on quarry of environmental information", IEEE Translations on Industrial Electronics, vol. 53, issue 4, Digital Object Identifier 10.1109/TIE.2006.878294, pp. 1373-1382, published 2006.
Sasaki et al., "Development of a new adaptation system for a manual wheelchair based on human body function", MHS '07 International Symposium on Micro-NanoMechatronics and Human Science, Digital Object Identifier, 10.1109/MHS.2007.4420902, pp. 478-484, published 2007.
Seong-Pal Kang, "A hand gesture controlled semi-autonomous wheelchair", IEEE/RSJ Intl Conf on Intelligent Robots and Systems, Digital Object Identifier: 10.1109/IROS.2004.1389968, pp. 3565-3570, vol. 4, published 2004.
Tanimoto et al., "Measurement of wheelchair position for analyzing transfer motion for SCI patient", Imaging Systems and Techniques, IST '07, IEEE International Workshop on Digital Object Identifier, 10.1009/IST.2007.379605, pp. 1-6, published 2007.
Dynamic, Actuator Remote Control Module DX-ARC5 Installation Manual, copyright Jun. 2004, 10 pgs.
Dynamic, DX Attendant Control Unit (ACU) Installation Manual, No. 60013, issue 4, Nov. 1998, 30 pgs.
Dynamic, DX Dolphin Remote (DX-Rem34) Installation Manual, No. 60025, issue 5, Jan. 1999, 69 pgs.
Dynamic, DX Power Module (PMB, PMB1, PMB2, PMB-S) Installation Manual, No. 63824, issue 2, Jul. 1998, 85 pgs.
Dynamic, DX Remote Joystick Module (RJM) Installation Manual, No. 60014, iss. 4, Apr. 1997, 13 pgs.
Dynamic, DX Two Actuator Module (TAM) Installation Manual, No. 60026, issue 5, Jul. 1998, 45 pgs.

(56) References Cited

OTHER PUBLICATIONS

Dynamic, DX-GB, The Complete Gearless Brushless DC Control System brochure, 2 pgs., date unknown.
Dynamic, DX-REMG90, DX-REMG90A, DX-REMG90T Master Remotes Installation Manual, GBK64048, issue 1, Jan. 2005, 61 pgs.
Flash, New and Notable Product Design, p. 28 from Design News Oct. 10, 2005.
Infineon Technologies, "XC164CS 16-Bit Single-Chip Microcontroller", Data Sheet, V2.1, Jun. 2003, 71 pgs.
Int'l App. No. PCT/US06/33963, International Search Report, mailed May 4, 2007, 3 pages.
Int'l App. No. PCT/US06/33963, Written Opinion of the International Searching Authority, mailed May 4, 2007, 6 pages.
Int'l App. No. PCT/US06/33964, International Search Report, mailed May 4, 2007, 3 pages.
Int'l App. No. PCT/US06/33964, Written Opinion of the International Searching Authority, mailed May 4, 2007, 10 pages.
Int'l App. No. PCT/US06/33971, International Search Report, mailed Mar. 9, 2007, 4 pages.
Int'l App. No. PCT/US06/33971, Written Opinion of the International Searching Authority, mailed Mar. 9, 2007, 6 pages.
Int'l App. No. PCT/US06/33973, International Search Report, mailed Mar. 16, 2007, 3 pages.
Int'l App. No. PCT/US06/33973, Written Opinion of the International Searching Authority, mailed Mar. 16, 2007, 5 pages.
Int'l App. No. PCT/US06/33978, International Search Report, mailed Jun. 5, 2007, 7 pages.
Int'l App. No. PCT/US06/33978, Invitation to Pay Additional Fees and Communication Relating to the Results of the Partial International Search, mailed Apr. 5, 2007, 8 pages.
Int'l App. No. PCT/US06/33978, Written Opinion of the International Searching Authority, mailed Jun. 5, 2007, 8 pages.
Int'l App. No. PCT/US06/34149, International Search Report, mailed Jun. 8, 2007, 3 pages.
Int'l App. No. PCT/US06/34149, Written Opinion of the International Searching Authority, mailed Jun. 8, 2007, 7 pages.
Invacare Corporation—Brochure—"Invacare Tarsys Series Powered Seating Systems", Form No. 00-313, rev. 09/02, 16 pgs.
Invacare Corporation—Brochure—"Storm Series Power Wheelchairs including Fomula CG Powered Seating, MK6i Electronics", 16 pgs., 2006, Form No. 06-040.
Invacare Corporation—Brochure "Invacare Storm Series TDX Power Wheelchairs, including Formula Powered Seating", Form No. 03-018, rev. 07/04, 32 pgs.
Invacare, Owner's Operator and Maintenance Manual, 3G Storm Series Wheelchair Bases, Arrow RWD, Torque SP RWD, Ranger X RWD, dated Jun. 30, 2006, 88 pgs., Part No. 1143151.
Invacare, Owner's Operator and Maintenance Manual, Formula, CG Powered Seating Tilt Only, 48 pgs., Part No. 1143155, dated Jun. 30, 2006.
Linak, Product Data Sheet, Actuator LA30, 8 pgs, Chapter 2.1, copyright 05.02.
Linak, Product Data Sheet, Actuator LA31, 8 pgs, Chapter 5.8.2, copyright 05.05.
MK5 Electronics Top 10 Application Features, 2005 Spring Update, 10 pgs (2005).
Paula, Taking sensors out of motors, Mechanical Engineering, The American Society of Mechanical Engineers, www.memagazine.org/backissues/ january98/ features/ sensout/ sensout.html, printed Aug. 16, 2006, 5 pgs (1998).
PG Drives Technology—R-Net Rehab-Powerchair Control System (Presentation), 30 pages, date unknown.
QR-ED Owners's Manual, Quickie Enhanced Display, Sunrise Medical, Inc., Longmont,Colorado, 10519 Rev. A, 2006 (51 pages).
Quantum Rehab Innovative Rehab Solutions, a division of Pride Mobility Products Corp., one page brochure, Q-Logic Drive Control System, QLOGIC-3-13-06 (Mar. 13, 2006).
Quantum Rehab Innovative Rehab Solutions, a division of Pride Mobility Products Group, Q controls, page from http://www.pridemobility.com/quantum/Electronics/Q_Controls/q_controls.html, printed Jun. 9, 2006, copyright 1995-2006.
Quickie HHP Programming Tree, Sunrise Medical, Inc., Longmont, Colorado (7 pages).
Service Manual, Quickie Rhythm & Groove, Sunrise Medical, Inc., Longmont, Colorado, 014061 Rev. A, 2006 (104 pages).
Specialty Control Set Up & Programming Guide, QR-SCM Owner's Manual, Quickie Electronics Platform powered by Delphi, Sunrise Medical, Inc., Longmont, Colorado, 101748 Rev. A, 2006 (15 pages).
Notice of Allowance in U.S. Appl. No. 13/430,011 dated Jan. 9, 2013.
First Office Action in CA Application No. 2,614,744 dated Feb. 1, 2013.
First Office Action from CA Application No. 2,615,084 dated Feb. 1, 2013.
2nd Examination Report from AU Appl. No. 2006284747 dated Mar. 21, 2013.
First Office Action in CA Application No. 2,615,087 dated Mar. 1, 2013.
Office action from U.S. Appl. No. 13/412,034 dated Mar. 19, 2013.
Response to Office Action from AU Application No. 2006284747 dated Feb. 26, 2013.
First Office Action in CA Application No. 2,616,332 dated Feb. 5, 2013.
First Office Action in CA Application No. 2,616,325 dated Feb. 4, 2013.
First Office Action from CA Application No. 2,615,091 dated Jan. 30, 2013.
Corrected Notice of Allowability for U.S. Appl. No. 13/430,011 dated Feb. 19, 2013.
First Office Action from CA Application No. 2,614,752 dated Feb. 5, 2013.
Office action from U.S. Appl. No. 14/027,970 dated May 16, 2014.
Office action from New Zealand Application No. 591831 dated Mar. 28, 2011.
Response from U.S. Appl. No. 14/027,970 dated Aug. 18, 2014.
Notice of Allowance from U.S. Appl. No. 141027,970 dated Oct. 28, 2014.
Response from European Application No. 06813984.9 dated Oct. 31, 2014.
Office action from Canadian Application No. 2,616,325 dated Jul. 14, 2014.
Office action from Canadian Application No. 2,616,332 dated Sep. 23, 2014.
Response from Canadian Application No. 2,616,332 dated Mar. 26, 2014.
Teknic, Inc., "The price/performance leader for OEM machine automation", Investigating Servo Architectures, 14 pgs. printed Aug. 15, 2006 from http://www.teknic.com/systems/, copyright 2006.
Office action from U.S. Appl. No. 11/513,740 dated Feb. 4, 2010.
Response from U.S. Appl. No. 11/513,740 dated Jul. 6, 2010.
Office action from U.S. Appl. No. 11/513,740 dated Oct. 4, 2010.
Response from U.S. Appl. No. 11/513,740 dated Feb. 4, 2011.
Office action from U.S. Appl. No. 11/513,740 dated Apr. 21, 2011.
Response from U.S. Appl. No. 11/513,740 dated Jul. 21, 2011.
Office action from U.S. Appl. No. 11/513,740 dated Oct. 18, 2011.
Office action from U.S. Appl. No. 11/514,016 dated Feb. 22, 2010.
Response from U.S. Appl. No. 11/514,016 filed Jul. 21, 2010.
Notice of Allowance from U.S. Appl. No. 11/514,016 dated Sep. 30, 2010.
Comments on Statement of Reasons for Allowance from U.S. Appl. No. 11/514,016 dated Oct. 29, 2010.
Notice of Allowance from U.S. Appl. No. 11/514,016 dated Jan. 19, 2011.
Notice of Allowance from U.S. Appl. No. 11/514,016 dated May 5, 2011.
Response from U.S. Appl. No. 11/514,016 dated Aug. 4, 2011.
Notice of Allowance from U.S. Appl. No. 11/514,016 dated Sep. 12, 2011.
Office action from U.S. Appl. No. 11/513,854 dated Apr. 15, 2009.
Response from U.S. Appl. No. 11/513,854 dated Oct. 15, 2009.
Office action from U.S. Appl. No. 11/513,854 dated Feb. 3, 2010.
Response from U.S. Appl. No. 11/513,854 dated Aug. 3, 2010.

(56) References Cited

OTHER PUBLICATIONS

Notice of Allowance from U.S. Appl. No. 11/513,854 dated Jul. 18, 2011.
Notice of Allowance from U.S. Appl. No. 11/513,854 dated Oct. 4, 2011.
U.S. Appl. No. 11/511,606, Notice of Allowance and Fees Due with Notice of Allowability, 5 pages, mailed May 8, 2008.
Response to Office action from U.S. Appl. No. 11/511,606 dated Jan. 8, 2008.
Office Action from U.S. Appl. No. 11/511,606, 5 pages, mailed Sep. 13, 2007.
Response to Office action from U.S. Appl. No. 11/511,606 dated Aug. 24, 2007.
U.S. Appl. No. 11/511,606, Final Office Action, 5 pages, mailed Jun. 7, 2007.
Response to Office action from U.S. Appl. No. 11/511,606 submitted Mar. 21, 2007.
U.S. Appl. No. 11/511,606, Non-final Office Action, 4 pages, mailed Dec. 21, 2006.
Office action from U.S. Appl. No. 11/513,780 dated Jan. 27, 2011.
Response from U.S. Appl. No. 11/513,780 dated Apr. 27, 2011.
Office action from U.S. Appl. No. 11/513,780 dated Aug. 2, 2011.
U.S. Appl. No. 11/513,746, Non-final Office Action, 7 pages, mailed Jun. 26, 2008.
Response to Office action from U.S. Appl. No. 11/513,746 dated Oct. 27, 2008.
Office action from U.S. Appl. No. 11/513,746 dated Jan. 15, 2009.
Office action from U.S. Appl. No. 11/513,802 dated Aug. 7, 2009.
Response from U.S. Appl. No. 11/513,802 dated Dec. 3, 2009.
Office action from U.S. Appl. No. 11/513,802 dated Mar. 19, 2010.
Response from U.S. Appl. No. 11/513,802 dated Aug. 19, 2010.
Office action from U.S. Appl. No. 111513,802 dated Oct. 6, 2010.
Response from U.S. Appl. No. 11/513,802 dated Feb. 4, 2011.
Office action from U.S. Appl. No. 11/513,802 dated Apr. 14, 2011.
Response from U.S. Appl. No. 11/513,802 dated Jul. 14, 2011.
Notice of Allowance from U.S. Appl. No. 11/513,802 dated Aug. 25, 2011.
Notice of Allowance from U.S. Appl. No. 11/513,802 dated Oct. 3, 2011.
Office action from U.S. Appl. No. 12/064,697 dated Jun. 22, 2011.
Amendment with Terminal Disclaimer from U.S. Appl. No. 12/064,697 dated Sep. 22, 2011.
Notice of Allowance from U.S. Appl. No. 12/064,697 dated Nov. 23, 2011.
Office action from Australian Application No. 2006284687 dated Jul. 26, 2011.
Notice of Allowance from U.S. Appl. No. 13/228,677 dated Jun. 5, 2012.
Examiner Initiated Interview Summary from U.S. Appl. No. 13/228,677 dated Jun. 5, 2012.
Statement of Substance of Interview from U.S. Appl. No. 11/513,740 dated Feb. 23, 2012.
Response to Office Action from Australian Application No. 2006284749 dated Apr. 30, 2012.
Second Examination Report from New Zealand Application No. 591,831 dated Aug. 16, 2012.
Office Action from U.S. Appl. No. 13/430,011 dated Aug. 8, 2012.
Response with RCE from U.S. Appl. No. 11/513,780 dated Feb. 2, 2012.
Office Action from U.S. Appl. No. 11/513,780 dated Mar. 30, 2012.
Final Office Action from U.S. Appl. No. 11/513,740 dated Apr. 13, 2012.
First Office Action from EP Application No. 06813984.9 dated Apr. 24, 2012.
Amendment from U.S. Appl. No. 13/228,677 dated May 2, 2012.
Interview Summary from U.S. Appl. No. 11/513,740 dated Jan. 27, 2012.
Office action from U.S. Appl. No. 11/513,750 dated Nov. 23, 2009.
Response from U.S. Appl. No. 11/513,750 dated May 21, 2010.
Notice of Allowance from U.S. Appl. No. 11/513,750 dated Dec. 2, 2010.
Notice of Allowance from U.S. Appl. No. 11/513,750 dated Jan. 20, 2011.
Notice of Allowance from U.S. Appl. No. 11/513,750 dated May 5, 2011.
Notice of Allowance from U.S. Appl. No. 111513,750 dated Oct. 12, 2011.
Office action from Australian Application No. 2009230975 dated Nov. 24, 2010.
Response from Australian Application No. 2009230975 dated Nov. 30, 2011.
Office action from U.S. Appl. No. 13/228,677 dated Feb. 2, 2012.
Response from New Zealand Application No. 591,831 dated Jul. 23, 2012.
Response from European Application No. 06813984.9 dated Oct. 18, 2012.
Office action from New Zealand Application No. 592,271 dated Nov. 16, 2012.
Response from U.S. Appl. No. 13/430,011 dated Dec. 7, 2012.
Response from Australian Application No. 2006284687 dated Dec. 19, 2012.
Response from New Zealand Application No. 591,831 dated Nov. 12, 2012.
Ex Parte Quayle Action for U.S. Appl. No. 13/646,989 dated Jun. 27, 13.
Office action from Canadian Application No. 2,616,332 dated Sep. 26, 2013.
Office action from Australian Application No. 2006284747 dated Jul. 1, 2011.
Exam Report from Australian Application No. 2006284748 dated Sep. 14, 2011.
Office action from Australian Application No. 2006284749 dated Apr. 28, 2011.
Office action from Australian Application No. 2006284741 date May 9, 2011.
Office action from Australian Application No. 2006284753 dated Jul. 22, 2011.
Exam Report from Australian Application No. 2006284768 dated Sep. 8, 2011.
Office action from New Zealand Application No. 565,929 dated Oct. 8, 2009.
Response from New Zealand Application No. 565,929 dated Mar. 7, 2011.
Office action from New Zealand Application No. 565,929 dated Mar. 25, 2011.
Response from New Zealand Application No. 565,929 dated May 11, 2011.
Office action from New Zealand Application No. 565,930 dated Oct. 7, 2009.
Response from New Zealand Application No. 565,930 dated Feb. 22, 2011.
Office action from New Zealand Application No. 565,930 dated Mar. 10, 2011.
Response from New Zealand Application No. 565,930 dated May 5, 2011.
Office action from New Zealand Application No. 565,930 dated May 26, 2011.
Response from New Zealand Application No. 565,930 dated Jun. 24, 2011.
Office action from New Zealand Application No. 565,931 dated Oct. 8, 2009.
Response from New Zealand Application No. 565,931 dated Mar. 7, 2011.
Office action from New Zealand Application No. 565,931 dated Mar. 25, 2011.
Response from New Zealand Application No. 565,931 dated May 4, 2011.
Office action from New Zealand Application No. 565,932 dated Oct. 12, 2009.
Response from New Zealand Application No. 565,932 dated Mar. 21, 2011.

(56) References Cited

OTHER PUBLICATIONS

Office action from New Zealand Application No. 565,932 dated Mar. 29, 2011.
Response from New Zealand Application No. 565,932 dated May 13, 2011.
Office action from New Zealand Application No. 565,933 dated Sep. 28, 2009.
Response from New Zealand Application No. 565,933 dated Feb. 16, 2011.
Office action from New Zealand Application No. 565,933 dated Feb. 28, 2011.
Response from New Zealand Application No. 565,933 dated Apr. 18, 2011.
Office action from New Zealand Application No. 565,934 dated Oct. 12, 2009.
Response from New Zealand Application No. 565,934 dated Mar. 7, 2011.
Office action from New Zealand Application No. 565,934 dated Mar. 28, 2011.
Response from New Zealand Application No. 565,934 dated May 13, 2011.
Office action from New Zealand Application No. 565,935 dated Oct. 5, 2009.
Response from New Zealand Application No. 565,935 dated Feb. 4, 2011.
Office action from New Zealand Application No. 565,935 dated Feb. 18, 2011.
Response from New Zealand Application No. 565,935 dated Apr. 15, 2011.
Office action from New Zealand Application No. 591,829 dated Mar. 28, 2011.
Office action from New Zealand Application No. 591,831 dated Mar. 28, 2011.
Office action from New Zealand Application No. 592,271 dated Apr. 20, 2011.
Office action from New Zealand Application No. 592,317 dated Apr. 21, 2011.
US 8,538,599, 09/2013, Peters et al. (withdrawn)

* cited by examiner

268

| MK6I PROGRAMMING | | | | |
|---|---|---|---|---|
| PARAMETER | D1 | D2 | D3 | D4 |
| SPEED | 100 | 100 | 100 | 100 |
| RESPONSE | 100 | 100 | 100 | 100 |
| PERFORMANCE ADJUST | >>> | | | |
| STANDARD PROGRAMS | >>> | | | |
| MEMORY CARD | >>> | | | |
| POWERED SEATING | >>> | | | |
| SETTINGS | >>> | | | |
| CALIBRATIONS | >>> | | | |
| DIAGNOSTICS | >>> | | | |

FIG. 17

| CALIBRATION | LCD DISPLAY | | |
|---|---|---|---|
| HARD PUFF | HARD PUFF CAL. | | |
| SOFT PUFF | MIN | 70 | MAX |
| HARD SIP | S | | H |
| SOFT SIP | | | |
| TILT CALIBRATE | TILT CALIBRATE | | |
| RECLINE CALIBRATE | MOVE UP | | > |
| CM LEGS CALIBRATE | SET UP ANGLE | | ° |
| | MOVE DOWN | | > |
| | SET DOWN ANGLE | | ° |

FIG. 29

| ERROR CODE | SYMPTOM | PROBABLE CAUSE | SOLUTIONS |
|---|---|---|---|
| E01 (FWD) E02 (REV) E03 (LFT) E04 (RGT) | 🛇 JS REV TOO LARGE 🛇 JS FWD TOO LARGE 🛇 JS LFT TOO LARGE or 🛇 JS RGT TOO LARGE displays and the wheelchair does not drive. | The joystick or input device is sending a value outside of the reverse, forward, left or right limits. | Replace joystick or input device. |
| E09 (Right) E10 (Left) | ⚠ SPM L Park Brake Fault or ⚠ SPM R Park Brake Fault displays and wheelchair does not drive. | Motor lock levers disengaged. | Engage motor lock levers. |
| E14 | All other joysticks or Display - ⚠ SPM Battery Fault displays and the wheelchair does not drive. | Batteries need to be charged. | Charge batteries. If batteries fail to charge properly, check battery charger or replace batteries. |
| E18 | All other joysticks or Display - NEUTRAL TESTING displays. | The joystick neutral test has failed. | Release the joystick and try to get the joystick back into the center-most position. |

FIG. 33A

| ERROR CODE | SYMPTOM | PROBABLE CAUSE | SOLUTIONS |
|---|---|---|---|
| E19 | ● BAD JOYSTICK CAL VALUES displays and the wheelchair does not drive. | The joystick calibration values are outside of the expected range. | Re calibrate the joystick (joystick throw procedure). |
| E28 | All other joysticks or Display - CHARGER PLUGGED IN displays. | Battery charger connected. | Unplug battery charger from the wheelchair. |
| E32 | ● JOYSTICK TIMEOUT displays and the wheelchair does not drive | Joystick or input device is disconnected. | Turn off power, reconnect the joystick of input device and turn power on. |
| E41 | ⚠ SPM Communications Fault displays and the wheelchair drives slowly. | The controller has determined a fault during a previous turn-off process. | Turn the wheelchair off and back on. |
| E200 | ⚠ SPM NOT CONNECTED | The MPJ or Display module is not communicating with the control module. | Check the connections between the joystick or display and the controller. Turn the power off and then back on. Replace the controller if necessary. |
| W01 | ⚠ TILT WARNING displays and the wheelchair will not drive. | The system is tilted or reclined beyond drive lock-out angle of 20°. | Return the system to upright position. |
| W02 | ⚠ MAX BACK ANGLE displays. | The wheelchair back has reached the maximum programmed back angle on a wheelchair with a TIAM, RIAM or TRAM. | The wheelchair back will not go past the programmed maximum back angle. This is normal behavior. |
| W03 | ⚠ SPM Inhibited displays and the wheelchair does not drive. | The system is tilted or reclined beyond the drive lock-out angle of 20°. | Return the system to the upright position. |
| W04 | ⚠ SPM Slow Down is displayed and the wheelchair drives slowly. | The elevating seat is elevated. | Return elevating seat to the lowest position to drive at full speed. |
| W05 | ATTENDANT ACTIVE and 🕹 displays. | The Proportional or Digital Attendant control is active and can be used to drive the wheelchair. | This is normal behavior. |

FIG. 33B

METHOD AND APPARATUS FOR SETTING OR MODIFYING PROGRAMMABLE PARAMETERS IN POWER DRIVEN WHEELCHAIR

CROSS-REFERENCE TO RELATED APPLICATIONS

This application is a continuation of U.S. patent application Ser. No. 13/646,989, filed on Oct. 8, 2012, now abandoned, which is a continuation of U.S. patent application Ser. No. 13/228,677, filed on Sep. 9, 2011, now U.S. Pat. No. 8,285,440, which is a divisional of U.S. patent application Ser. No. 11/513,750, filed on Aug. 31, 2006, now U.S. Pat. No. 8,073,585, which claims the benefit of eight U.S. provisional patent applications, including Ser. No. 60/712,987, filed Aug. 31, 2005, Ser. No. 60/727,005, filed Oct. 15, 2005, Ser. No. 60/726,983, filed Oct. 15, 2005, Ser. No. 60/726,666, filed Oct. 15, 2005, Ser. No. 60/726,981, filed Oct. 15, 2005, Ser. No. 60/726,993, filed Oct. 15, 2005, Ser. No. 60/727,249, filed Oct. 15, 2005, and Ser. No. 60/727,250, filed Oct. 15, 2005. This application is also related to seven U.S. utility patent applications filed on the same day, including Ser. No. 11/513,740, now abandoned, entitled "Mode Programmable Actuator Controller for Power Positioning Seat or Leg Support of a Wheelchair," Ser. No. 11/514,016, now U.S. Pat. No. 8,073,588 entitled "Method and Apparatus for Setting or Modifying Programmable Parameters in Power Driven Wheelchair," Ser. No. 11/511,606, now U.S. Pat. No. 7,403,844, entitled "Method and Apparatus for Programming Parameters of a Power Driven Wheelchair for a Plurality of Drive Settings," Ser. No. 11/513,780, now abandoned, entitled "Adjustable Mount for Controller of Power Driven Wheelchair," Ser. No. 11/513,746, now abandoned, entitled "Method and Apparatus for Automated Positioning of User Support Surfaces in Power Driven Wheelchair," Ser. No. 11/513,854, now U.S. Pat. No. 8,065,051, entitled "Context-Sensitive Help for Display Device Associated with a Power Driven Wheelchair," and Ser. No. 11/513,802, now U.S. Pat. No. 8,127,875, entitled "Power Driven Wheelchair." The contents of all above-identified patent application(s) and patent(s) are fully incorporated herein by reference.

BACKGROUND

Power driven wheelchairs generally include right and left drive wheels driven by a motor controller via corresponding right and left drive motors. A power driven wheelchair may also include actuators, motors, or other devices to control user support surfaces, such as seats, backs, leg rests, foot rests, or head rests. These various actuators, motors, and other devices may be controlled via a user interface device. The user interface device may include input devices, such as a joystick, pushbuttons and other types of switches, potentiometers and other types of control devices, and output devices, such as a graphic display, alphanumeric display, or indicators. Input devices for special needs users, such as a proportional head control, a sip n' puff system, a fiber optic tray array, a proximity head array, or a proximity switch array, may also be provided as a user interface device or as a remote input to the user interface device.

Examples of power driven wheelchairs are provided in a product brochure entitled "Invacare® Storm® Series TDX™ Power Wheelchairs, including Formula™ Powered Seating," Form No. 03-018, 2004 from Invacare Corporation of Elyria, Ohio, the contents of which are fully incorporated herein by reference. Additional examples of power driven wheelchairs are provided in another product brochure entitled "Invacare® Tarsys® Series Powered Seating System," Form No. 00-313, 2002 from Invacare Corporation, the contents of which are fully incorporated herein by reference.

Currently, a separate remote programmer unit may be used to set or modify programmable parameters, such as calibration values associated with operation and support of a given power driven wheelchair. Currently when a fault condition of one more wheelchair components is detected, a fault code is logged for later extraction and analysis using the remote programming unit. Examples of remote programmers and their use in conjunction with a power driven wheelchair are provided in U.S. Pat. No. 6,871,122 to Wakefield, II and U.S. Pat. No. 6,819,981 to Wakefield, II et al., both assigned to Invacare Corporation. The contents of both of these patents are fully incorporated herein by reference.

SUMMARY

A collection of diagnostic and troubleshooting information associated with a power driven wheelchair is stored for access by a microcontroller to be displayed to a user to assist in troubleshooting the power driven wheelchair. A user may request display of diagnostic information associated with a selected fault code. A log of fault codes transmitted by various fault-detecting mechanisms may be compiled and displayed as well.

The operating instructions of a power driven wheelchair may be updated by using portable storage media onto which a latest version of operating instructions is loaded to transfer the updated operating instructions to wheelchair controller memory.

The calibration of a power driven wheelchair can be simplified by providing functionality within the wheelchair controller to change calibration parameters or to transfer calibration parameters from portable storage media.

BRIEF DESCRIPTION OF THE DRAWINGS

FIG. 17 is an exemplary display screen of a main menu component associated with programming various aspects of a power driven wheelchair;

FIGS. 26-29 are a series of exemplary display screens associated with updating one or more calibration parameters associated with a power driven wheelchair.

FIG. 33A is a portion of a chart that enumerates diagnostic and troubleshooting fault codes associated with operation and support of a power driven wheelchair.

FIG. 33B is another portion of the chart that enumerates diagnostic and troubleshooting fault codes associated with operation and support of a power driven wheelchair.

DETAILED DESCRIPTION

Figure 1:
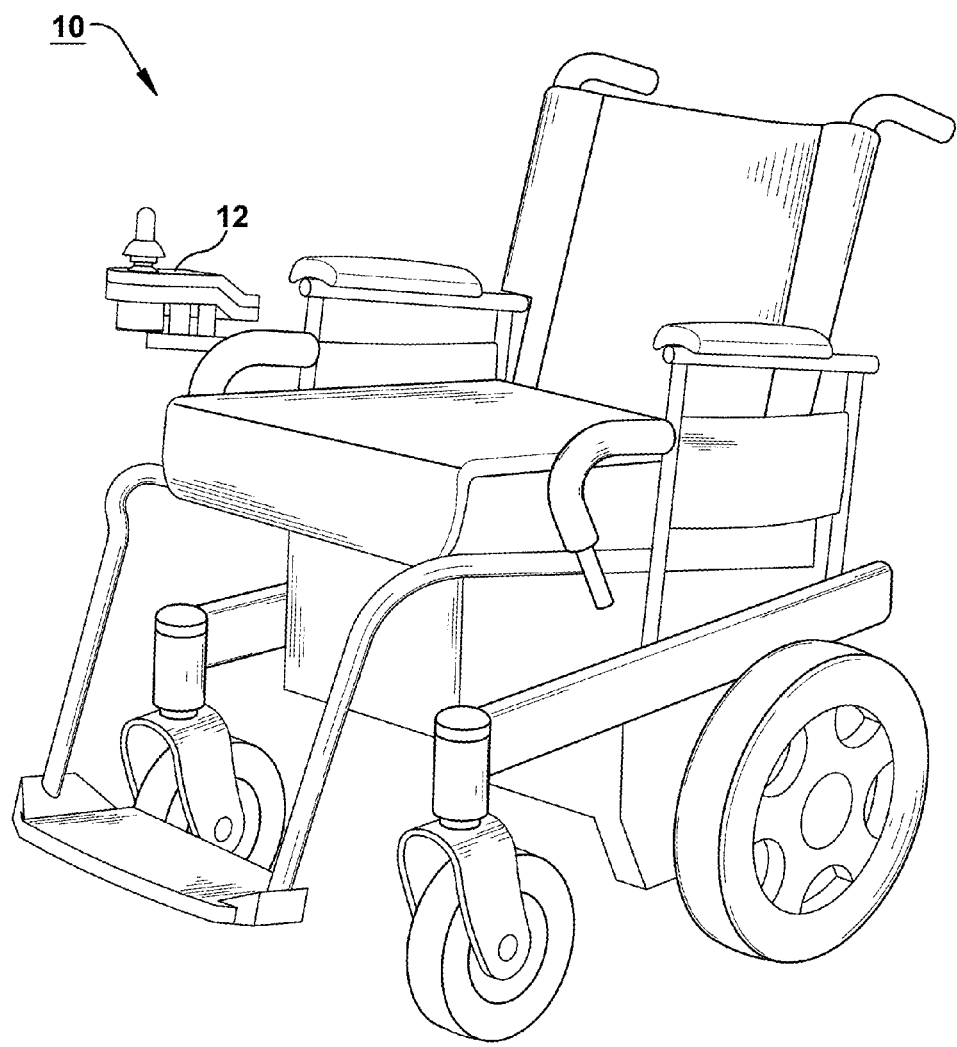
FIGS. 1-2 show exemplary embodiments of a power driven wheelchair.

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein, includes, but is not limited to necessarily require, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more enumerated elements or method steps.

"Controller," as used herein, includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein, includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Operative communication," as used herein, includes, but is not limited to, a communicative relationship between devices, logic, or circuits including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or' is used to describe a list of alternative things in which one may choose one option or any combination of alternative options. For example, "A or B" means "A or B or both" and "A, B, or C"

means "A, B, or C, in any combination." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combination of alternatives are not included in the choices associated with the list.

"Processor," as used herein, includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein, includes, but is not limited to, one or more electrical signals, including analog or digital signals, one or more computer instructions, a bit or bit stream, or the like.

"Software," as used herein, includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other types of executable instructions. It will be appreciated by one of ordinary skill in the art that the form of software is dependent on, for example, requirements of a desired application, the environment it runs on, or the desires of a designer/programmer or the like.

With reference to FIG. 1, an exemplary embodiment of a power driven wheelchair 10 includes a system controller 12. The system controller 12 controls operation of the power driven wheelchair 10. Other embodiments of power driven wheelchairs and other embodiments of system controllers are available in various combinations. For example, as shown if FIG. 2, another exemplary embodiment of a power driven wheelchair 20 includes a system controller 22.

Figure 3:
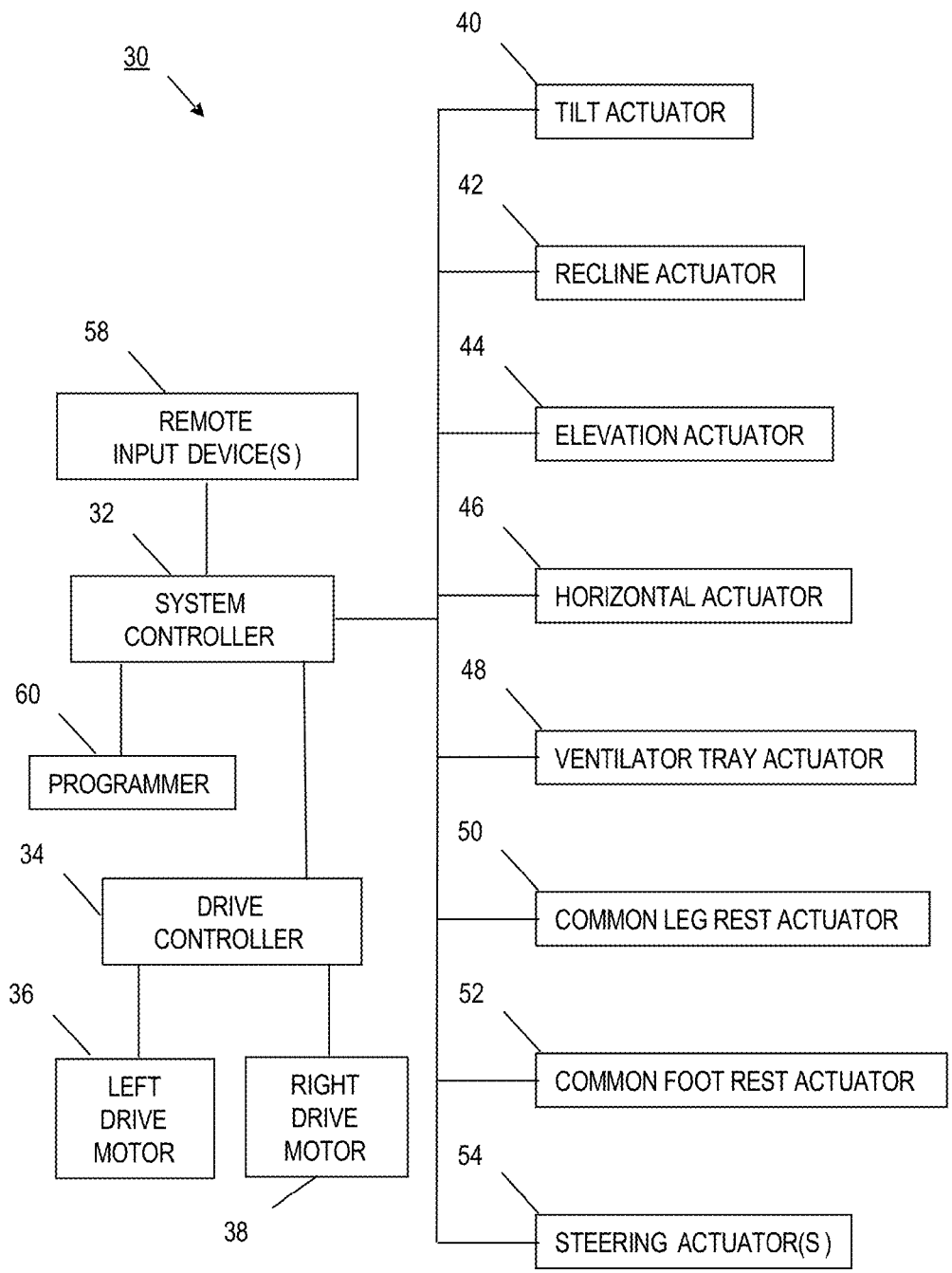
FIG. 3 is a block diagram of an exemplary embodiment of a power driven wheelchair.

With reference to FIG. 3, an exemplary embodiment of a power driven wheelchair 30 is depicted in block diagram fashion. As shown, the power driven wheelchair 30 may include a system controller 32, a drive controller 34, a left drive motor 36, a right drive motor 38, and a suitable power source (e.g., battery) (not shown). The system controller 32 may include a user interface device and may control the drive controller 34 in response to activation of one or more input devices associated with the user interface device and in response to software programs for one or more operating or support modes. The software programs may use a plurality of programmable parameters arranged in sets associated with, for example, different environmental conditions to define driving response characteristics. The drive controller 34 may control the left and right drive motors 36, 38 in response to commands from the system controller 32. Communication between the system controller 32 and drive controller 34 may be via serial or parallel bus connections or via discrete signal connections. For example, a Shark serial communication bus, developed by Dynamic Controls of New Zealand, may be used to communicate with the drive controller 34. In another embodiment, the system controller 34 may communicate directly with a left drive motor and a right drive motor via a serial communication bus, such as a controller area network (CAN) bus, where the left and right drive motors include a serial bus interface and local intelligence.

The power driven wheelchair 30 may also include various options, such as powered seating, powered front rigging, and powered steering. In one embodiment, the powered seating option may include a tilt actuator 40, a recline actuator 42, an elevation actuator 44, a horizontal actuator 46, and a ventilator tray actuator 48. In one embodiment, the powered front rigging option may include a common leg rest actuator 50 and a common foot rest actuator 52. In another embodiment, the powered front rigging option may include independent left and right leg rest actuators and independent left and right foot rest actuators. In one embodiment, the powered steering option may include one or more powered steering actuators 54. These options may be added to the wheelchair in any combination. Likewise, various combinations of actuators may be selected for each option. For example, a powered seating option may be limited to tilt and recline actuators 40, 42, tilt and elevation actuators 40, 44, recline and elevation actuators 40, 46, or tilt, recline, and elevation actuators 40, 42, 44. If the power driven wheelchair has split left and right leg rests, individual right and left leg rest actuators may be provided in lieu of the common leg rest actuator 50. Back and seat shear reduction, for example, may be provided by coordinated movement of the recline and horizontal actuators 42, 46. The system controller 32 may control the actuators in response to activation of one or more input devices associated with the user interface device and in response to software programs for one or more operating or support modes. The software programs may use a plurality of programmable parameters, for example, to define desired positions for user support surfaces and actuator response characteristics. Communication between the system controller 32 and actuators may be via serial or parallel bus connections or via discrete signal connections. For example, in one embodiment, actuators may include sensors and local electronics which provides an interface to a CAN bus. It is understood that any actuator may include a variable speed reversible motor, a stepper motor, a linear motor, a servo motor, or another suitable device associated with position control of an actuator mechanism. The actuator mechanism, for example, controlling the position of user support surfaces, such as seat, back, leg rest, foot rest, or head rest support surfaces, via a suitable linkage, drive train, coupling, or another type of mechanical interface.

In one embodiment, providing modularization of actuators, motors, and other output devices with sensors, detectors, or other devices providing feedback for closed loop control of the corresponding output device facilitates the use of a serial or parallel bus architecture in the power driven wheelchair 30. This also simplifies the addition or removal of optional output devices and streamlines upgrades and retrofits. Moreover, distributing intelligence, including interface circuits for output devices and associated feedback components, from the centralized controller to the modular output devices further improves performance through parallel processing. In additional embodiments, distributing additional intelligence, including closed-loop control algorithms, from the centralized controller to the modular output devices further improves performance through additional parallel processing and reduced bus traffic.

One or more remote input devices 58 may also be provided as options in the power driven wheelchair 30. For example, user interface devices for special needs users, such as a proportional head control, a sip n' puff system, a fiber optic tray array, a proximity head array, or a proximity switch array, may be provided as a remote input to the system controller 32. Additional examples of remote input devices 58 include, a 4-way toggle switch assembly, a quad pushbutton assembly, and a compact proportional joystick assembly. The 4-way toggle switch assembly or the quad pushbutton assembly, for example, may be used for controlling powered seating systems. The compact proportional joystick assembly, for example, may be used as a proportional attendant control. Communication between the system controller 32 and the remote input device(s) 58 may be via serial or parallel bus connections or via discrete signal connections. For example, a remote input device may be connected to a serial port on the system controller 32. If the remote input device includes the appropriate electronics and local intelligence (e.g., processes for composing and de-composing bus messages), communications with the system controller 32 may, for example, be via a CAN bus or another type of bus or network connection.

A programmer 60 may be used in conjunction with the power driven wheelchair 30. The programmer 60 described herein may be an optional accessory or special tool for dealers or technicians. The programmer 60 may be adapted for use on various models and configurations of power driven wheelchairs. Communication between the system controller 32 and the programmer 60 may be via serial or parallel bus connections or via discrete signal connections. For example, the programmer 60 may be connected to a serial port on the system controller 32. If the programmer 60 includes the appropriate electronics and local intelligence (e.g., processes for composing and de-composing bus messages), communications with the system controller 32 may, for example, be via a CAN bus or another type of bus or network connection. The various aspects of FIG. 3 described above may be automated, semi-automated, or manual and may be implemented through hardware, software, firmware, or combinations thereof.

Figure 4:
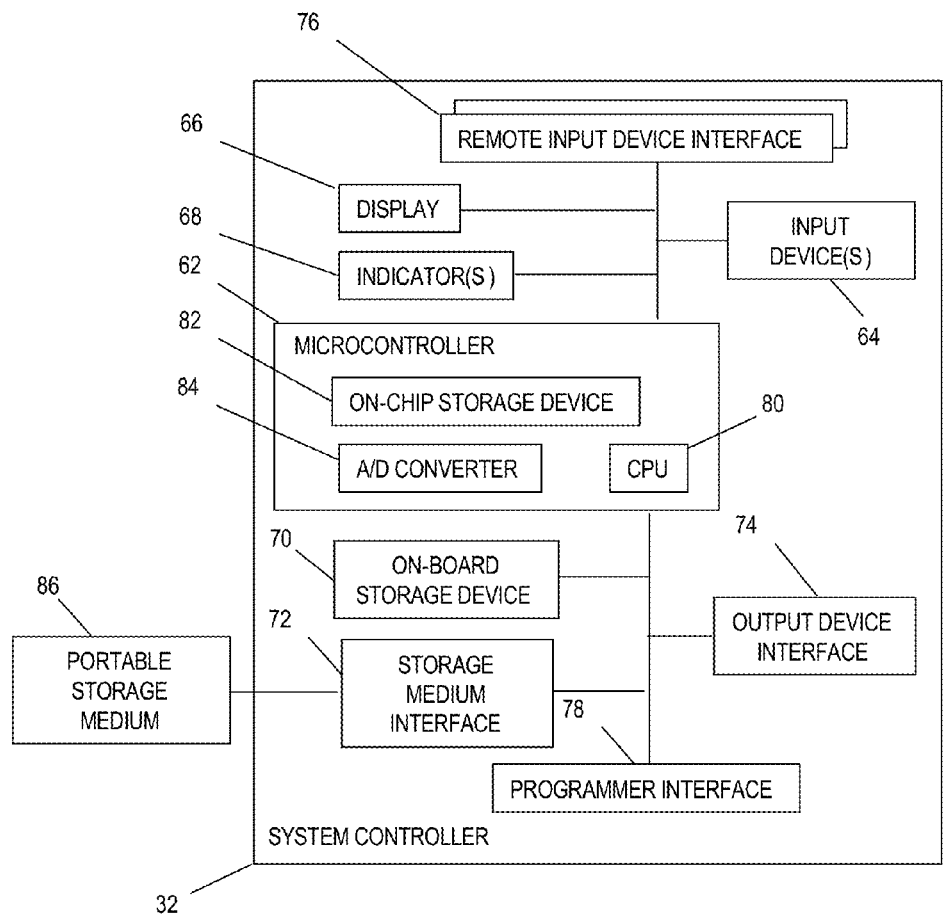
FIG. 4 is a block diagram of an exemplary embodiment of a system controller for a power driven wheelchair.

With reference to FIG. 4, a block diagram of an exemplary embodiment of a system controller 32 may include a microcontroller 62, one or more input devices 64, a display 66, one or more indicators 68, an on-board storage device 70, a storage medium interface 72, an output device interface 74, one or more remote input device interfaces 76, and a programmer interface 78. The microcontroller 62 may include a central processing unit (CPU) 80, an on-chip storage device 82, and an analog-to-digital (ND) converter 84. The ND converter 84 may provide the microcontroller 62 with an interface to receive analog input signals. In one embodiment, the microcontroller 62 may include an SAF-XC164CS 16-bit single-chip microcontroller by Infineon Technologies of München, Germany.

The display 66, for example, may include a 128×64 pixel graphic display or a 160×160 pixel graphic display. In additional embodiments, the display may include a graphic display in a different size or a different arrangement of pixels. Any type of graphic display may be used, such as a liquid crystal display (LCD). Additionally, an alphanumeric display or another type of display may be used. The one or more indicators 68, for example, may include light emitting diodes (LEDs), lamps, other types of visual indicators, or audible devices. The one or more input devices 64, for example, may include a proportional analog joystick, a three position toggle or rotary switch, a return-to-center momentary three position switch, a rotary potentiometer, and a plurality of momentary pushbuttons. In additional embodiments, the one or more input devices 64, may include other types of joysticks, switches, potentiometers, pushbuttons, or other types of control devices.

The output device interface 74 may be connected, for example, to a motor controller, actuators, motors, or similar devices associated with the power driven wheelchair. The output device interface 74 may include one or more serial ports, one or more parallel ports, or discrete wiring connections in any combination. For example, the output device interface 74 may include a CAN bus serial port and a Shark bus serial port. The one or more remote input device interfaces 76 and programmer interface 78 may each include a serial port, parallel port, or discrete wiring connections.

Figure 2:
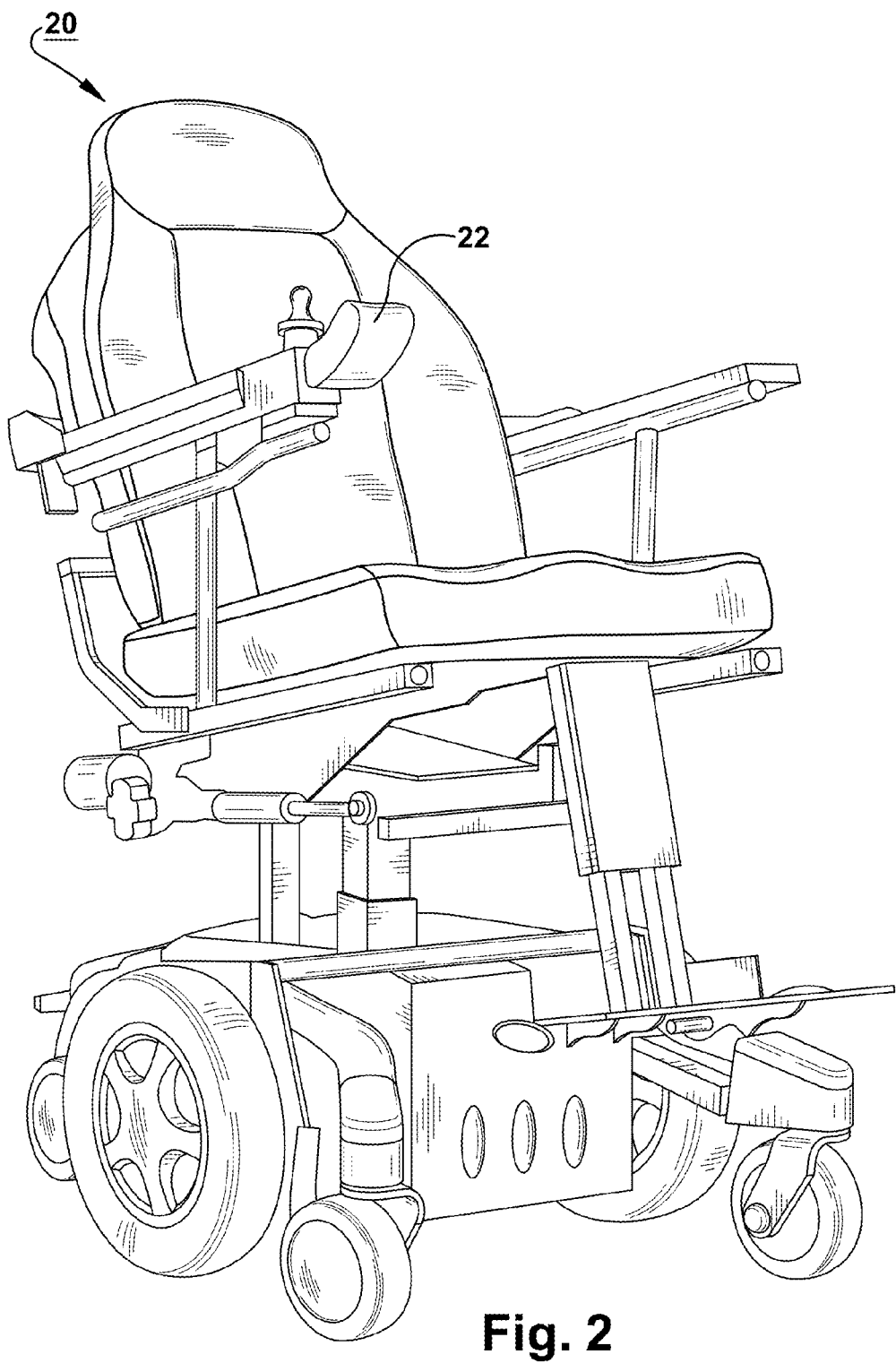

The microcontroller 62 may receive input signals from the one or more input devices 64, remote input devices 58 (FIG. 2) connected to the one or more remote input device interfaces 76, or a programmer 60 (FIG. 2) connected to the programmer interface 78. The microcontroller 62 may control the display 66, the one or more indicators 68, and various motors, actuators, and other output devices connected to the output device interface 74, at least in part, in response to the input signals from the one or more input devices 64, remote input devices 58 (FIG. 2), or programmer 60 (FIG. 2).

The on-board storage device 70 and on-chip storage device 82 each may include a volatile storage device, such as random access memory (RAM), and a non-volatile storage device, such as non-volatile memory, a fixed disk device, a removable disc device, an optical storage device, etc. Non-volatile memory, for example, may include read-only memory (ROM), programmable read-only memory (PROM), erasable programmable read-only memory (EPROM), electrically erasable programmable read only memory (EEPROM), or flash memory. For example, software programs, one or more programmable parameter sets, and diagnostic information may be stored in one or more non-volatile memory storage devices associated with the on-board storage device 70 or on-chip storage device 82. Each programmable parameter set may include a plurality of programmable operating parameters for the power driven wheelchair 20. The microcontroller 62 may run the software programs and may control the display 66, indicators 68, and various motors, actuators, and other output devices connected to the output device interface 74 based, at least in part, on one or more of the programmable operating parameters.

A portable storage medium 86 may be used in conjunction with the system controller 32. The portable storage medium 86 may include a plurality of storage locations which may store a security key, one or more library parameter sets, and a collection of diagnostic information. The portable storage medium 86 described herein may be an optional accessory or special tool for dealers or technicians. In some cases, the portable storage medium 86 may also be used in conjunction with normal operation of the power driven wheelchair by its owner or end user. The portable storage medium 86 described herein may be suitable for use on various models and configurations of power driven wheelchairs. However, in another scheme for protection and security of the information stored therein, a given portable storage medium 86 may be serialized or otherwise tailored and keyed to an individual system controller 32 and corresponding power driven wheelchair. Communication between the microcontroller 62 and the portable storage medium 86 may be via the storage medium interface 72.

The portable storage medium 86 may include a non-volatile storage medium, such as non-volatile memory. In one embodiment, the portable storage medium 86 may include, for example, a type of removable storage medium known as a removable memory card. For example, the portable storage medium 86 may include a secure digital (SD) card. In the embodiment being described, the storage medium interface 72 may include, for example, a corresponding removable memory interface (e.g., an SD card reader) to communicate and exchange information with the microcontroller 62.

In additional embodiments, the portable storage medium may include other types of removable memory, such as a compact flash (CF) card, a flash memory pen drive, a memory stick, a microdrive, a multimedia memory card (MMC), a smart media (SM) card, an xD picture card, a subscriber identity module (SIM) card, a memory chip (e.g., ROM, PROM, EPROM, EEPROM), or another suitable form of removable, separable, or detachable memory. In other additional embodiments, the portable storage medium may include other forms of removable storage medium, such as optical discs (e.g., compact discs (CDs), digital video discs (DVDs)) or floppy disks (e.g., zip disks).

In still further embodiments, the portable storage medium may include a portable storage device, such as an external memory card reader, an external optical disc drive, an external floppy disk drive, a portable computer (e.g., laptops, notebooks, personal digital assistants (PDAs)), a mobile telephone (e.g., cellular telephone, personal communication system, satellite telephone), a digital camera, an MP3 player, or any type of portable storage device capable of wired or wireless communication with another compatible communication device.

The storage medium interface 72, for example, may include a connector or socket that mates with the portable storage medium 86 and an electronic circuit that supports communication between the microcontroller 62 and the portable storage medium 86. For example, the storage medium interface 72 may include a memory card reader, a memory chip socket, an optical disc drive, a floppy disk drive, a serial port (e.g., universal serial bus (USB) port, RS-232), a parallel port (e.g., small computer system interface (SCSI) port), a modem, an Ethernet port, a wireless Ethernet transceiver (e.g., IEEE 802.11b), a Bluetooth transceiver, an infrared (IR) transceiver, a radio frequency (RF) transceiver, a mobile telephone interface, a cable television interface, a satellite television interface, or any communication device capable of wired or wireless communication with a corresponding portable storage medium. The various aspects of FIG. 4 described above may be automated, semi-automated, or manual and may be implemented through hardware, software, firmware, or combinations thereof.

Figure 5:
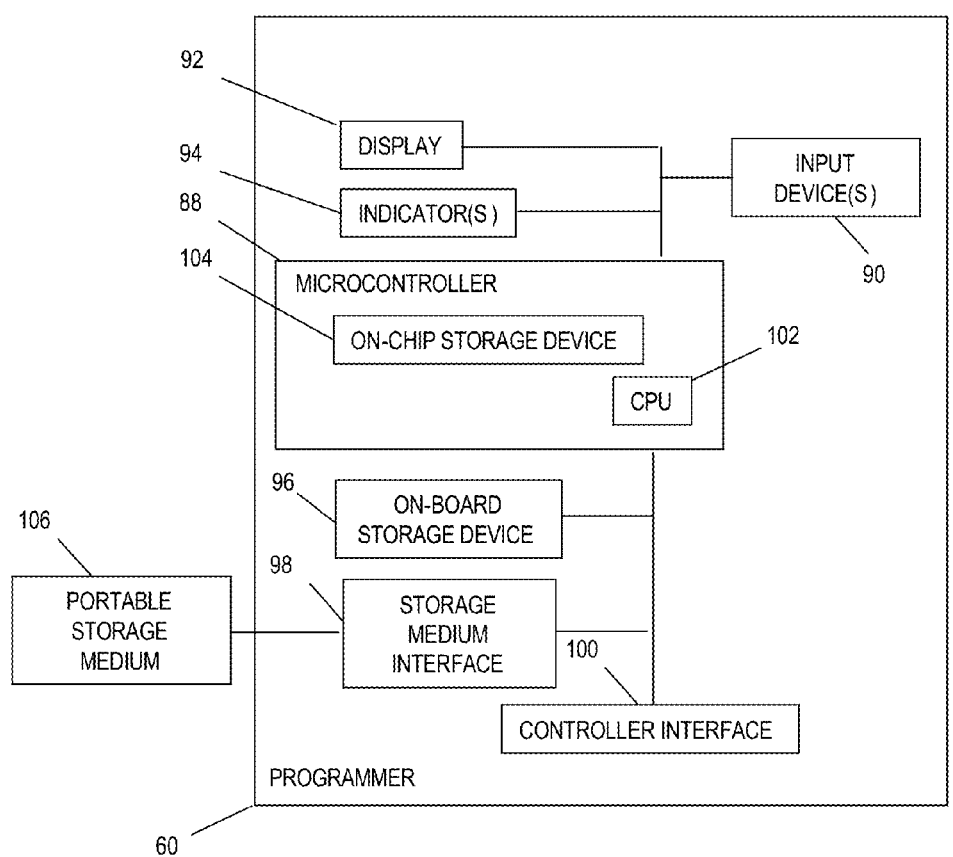
FIG. 5 is a block diagram of an exemplary embodiment of a programmer used in conjunction with related embodiments of power driven wheelchairs.

With reference to FIG. 5, an exemplary embodiment of a programmer 60 may include a microcontroller 88, one or more input devices 90, a display 92, one or more indicators 94, an on-board storage device 96, a storage medium interface 98, and a controller interface 100. The microcontroller 88 may include a CPU 102 and an on-chip storage device 104. In one embodiment, the microcontroller 88 may include an SAF-XC164CS 16-bit single-chip microcontroller by Infineon Technologies of München, Germany.

The display 92, for example, may include a 160×160 pixel graphic display. In additional embodiments, the display may include a graphic display in a different size or a different arrangement of pixels. Any type of graphic display may be used, such as an LCD. Additionally, an alphanumeric display or another type of display may be used. The one or more indicators 94, for example, may include LEDs, lamps, other types of visual indicators, or audible devices. The one or more input devices 90, for example, may include a plurality of momentary pushbuttons. In additional embodiments, the one or more input devices 90, may include other types of pushbuttons or other types of control devices.

The controller interface 100 may include a serial port, parallel port, or discrete wiring connections for interfacing with a system controller 32 (FIG. 2) of a power driven wheelchair. The microcontroller 88 may receive input signals from the one or more input devices 90 and the system controller connected to the controller interface 100. The microcontroller 88 may latch or store activations of the one or more input devices 90 or other input signals over time. The microcontroller 88 may control the display 92 and the one or more indicators 94, at least in part, in response to the input signals from the one or more input devices or the system controller.

The microcontroller 88 may periodically (e.g., every 10 ms) receive a status check message from the system controller 32 (FIG. 2) via the controller interface 100. For example, if an activation of the one or more input devices 90 has occurred since the last status check, the microcontroller 88 may send a response to the status check message via the controller interface 100 that may include information regarding the latched or stored activations from the one or more input devices 90. Once the response is sent, certain latched or stored activations may be cleared. If no activations occurred since the last status check, the microcontroller 88 may send a response to the status check message indicating there is no new data to send. The microcontroller 88, for example, may also receive messages from system controller via the controller interface 100 containing information to be displayed on the display 92 or commands regarding control of the display 92.

The on-board storage device 96 and on-chip storage device 104 each may include a volatile storage device, such as RAM, and a non-volatile storage device, such as non-volatile memory, a fixed disk device, a removable disc device, an optical storage device, etc. Non-volatile memory, for example, may include ROM, PROM, EPROM, EEPROM, or flash memory. For example, software programs, a plurality of programmable parameter sets, and diagnostic information may be stored in one or more non-volatile memory storage devices associated with the on-board storage device 96 or on-chip storage device 104. The microcontroller 88 may run the software programs and may control the display 92 and indicators 94 based, at least in part, on one or more of the programmable operating parameters.

A portable storage medium 106 may be used in conjunction with the programmer 60. Like the portable storage medium 86 (FIG. 4) associated with the system controller 32 (FIG. 4), the portable storage medium 106 may also be an optional accessory or special tool for dealers or technicians. Therefore, the various characteristics, options, and alternatives described above for the portable storage medium 86 and storage medium interface 72 (FIG. 4) also apply to the portable storage medium 106 and storage medium interface 98 in the programmer 60. The microcontroller 88 is in communication with the portable storage medium 106 via the storage medium interface 98. This enables the microcontroller 88 to retrieve data from the portable storage medium 106 and provide it to the system controller via the controller interface 100 or to save data received from the system controller to the portable storage medium 106.

In one embodiment, the portable storage medium 106 associated with the programmer 60 and the portable storage medium 86 (FIG. 4) associated with the system controller 32 (FIG. 2) may be interchangeable. In other words, the portable storage medium 106 may be used in conjunction with the system controller and vice versa. Moreover, this interchangeability may extend to other power driven wheelchairs. In other words, the portable storage medium 86 or 106 associated with the power driven wheelchair 10 (FIG. 1) may be used in system controllers or programmers associated with other power driven wheelchairs. This facilitates development of a master copy of library parameter sets on one or more portable storage medium that can be transported to multiple power driven wheelchairs for selective communication of library parameter sets from the master copy to corresponding system controllers associated with each power driven wheelchair. Additionally, programmable parameter sets can be selectively uploaded to the master copy to build or grow the library parameter sets from individual power driven wheelchairs. This is particularly useful after modifying a selected programmable parameter set on a first power driven wheelchair for a first user when a second user with a similar power driven wheelchair and similar physical impairments is identified. While a library parameter set and a corresponding programmable parameter set are equivalent (i.e., both including the same plurality of programmable operating parameters), it is sometimes useful to use the phrase "library parameter set" to refer to the plurality of programmable operating parameters on the portable storage medium and to use the phrase "programmable parameter set" to refer to them within the system controller. Nevertheless, the phrases have the same meaning and may be used interchangeably to refer to the plurality of programming operating parameters in any location. The various aspects of FIG. 5 described above may be automated, semi-automated, or manual and may be implemented through hardware, software, firmware, or combinations thereof.

Figure 6:
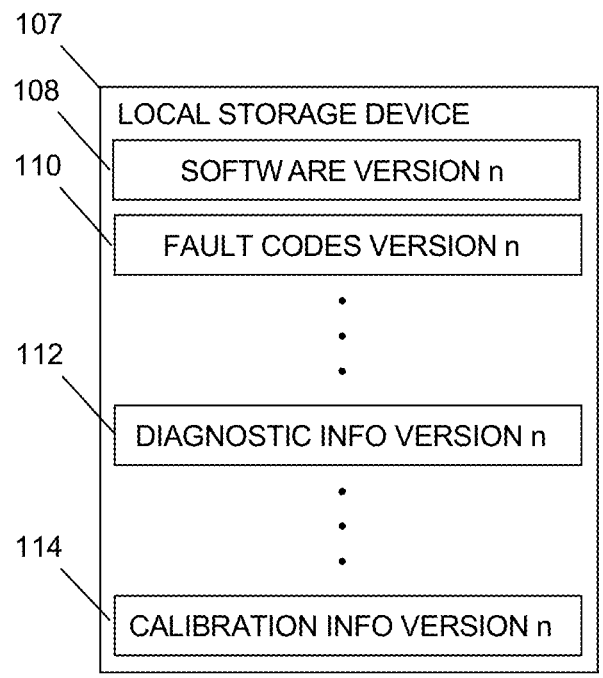
FIG. 6 is a block diagram of an exemplary embodiment of a local storage device associated with a system controller.

With reference to FIG. 6, an exemplary embodiment of the on-board storage device 107 associated with a system controller 32 (FIG. 4) may include a plurality of storage locations that may store software programs 108 and a plurality of collections of stored programmable parameter sets. The local storage device 107, for example, may include an on-board storage device 70 (FIG. 4), 96 (FIG. 5) or an on-chip storage device 82 (FIG. 4), 104 (FIG. 5). In one embodiment, for example, a first programmable parameter set is identified as fault code list version n 110, another programmable parameter set is identified as diagnostic information version n 112, and an additional programmable parameter set is identified as calibration options version n 114. It will be apparent to one of skill in the art that there may be more or less programmable parameter sets in additional embodiments. Each programmable parameter set may include multiple programmable operating parameters With reference to FIG. 7, an exemplary embodiment of the portable storage medium 115 is shown. The portable storage media may include a portable storage medium 86 (FIG. 4), 106 (FIG. 6) and may include a plurality of storage locations that may store a version n+1 of the software 116 and a plurality of parameter sets corresponding to the parameter sets stored in the on-board memory device. In one embodiment, for example, a first programmable parameter set is identified as fault code list version n+1 117, another programmable parameter set is identified as diagnostic information version n+1 118, and additional programmable parameter sets are identified as calibration options version n+1 119. The version number n+1 indicates that the programmable parameter sets stored on the portable storage media is a more recent version than the sets stored in the on-board memory device. As will be described below, the more recent version may replace the version stored in the on-board memory device.

Figure 8:
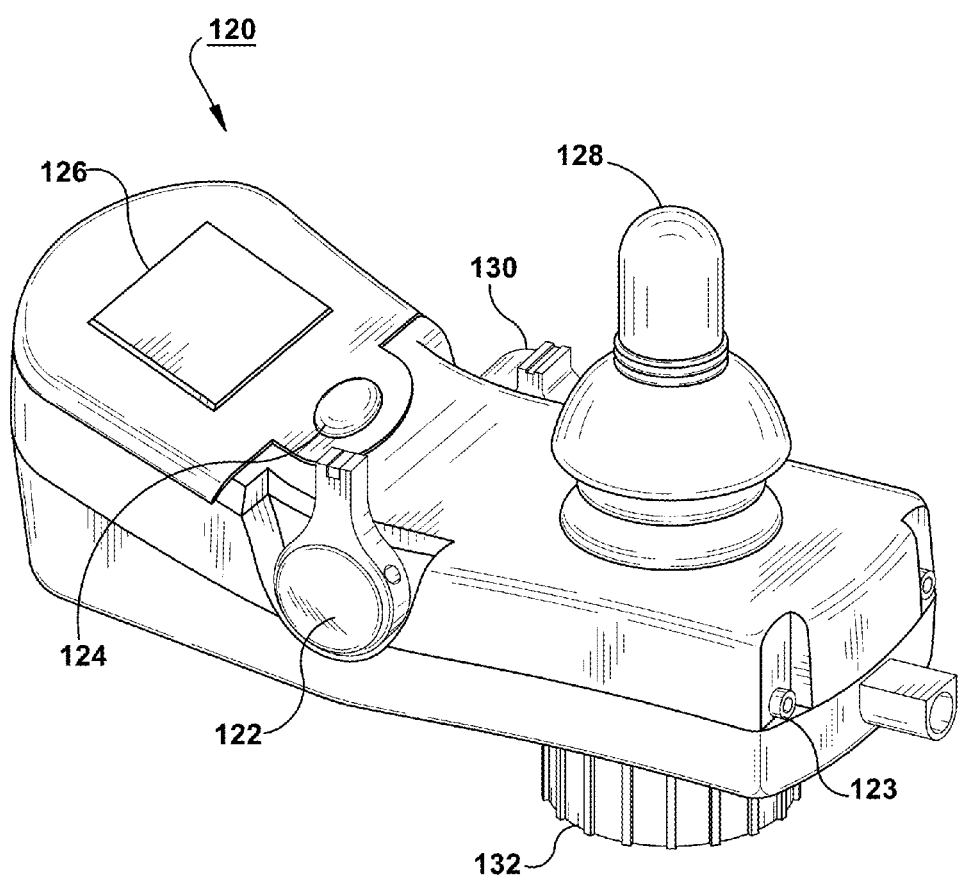
FIGS. 8-11 are perspective views of exemplary embodiments of a system controller for a power driven wheelchair.

With reference to FIG. 8, an exemplary embodiment of a system controller 120 may include a power/drive select switch 122, a mode select switch 124, a graphic display 126, a joystick control 128, a speed control 130, and a mounting hub 132. This configuration of the system controller 120 may be referred to as a multi-purpose joystick (MPJ) model. The MPJ model may also include a removable memory card slot (not shown) for receiving a portable storage medium 86 (FIG. 4), such as a removable memory card. The MPJ model also includes a stereo input port 123 that can be operated to receive two input signals, through two "virtual" mono ports. As will be describe in more detail below, through the calibration process, the user can assign a function to the signal received by these mono ports.

The power/drive select switch 122, for example, may include a three position rotary switch. The "on" position, for example, is a center position where the power driven wheelchair is powered on. The "drive select" position is a return-to-center position that advances through the available drives (i.e., programmable parameter sets). For example, when the "drive select" position is activated in programming mode, a next programmable parameter set from a group of programmable parameter sets stored in the system controller 32 is selected in relation to a currently-selected programmable parameter set. In one embodiment, the plurality of programmable parameters may include four programmable parameter sets. However, there may be more or less programmable parameter sets in additional embodiments. The "off" position of the power/drive select switch 122 is, for example, a latching position opposite the "drive select" position where the power driven wheelchair is powered down.

The mode select switch 103, for example, is a momentary pushbutton switch. When the mode select switch 103 is activated, for example, a next mode from a plurality of modes is selected in relation to a currently-selected mode. The plurality of modes, for example, may include a driving mode, an automated positioning mode associated with powered seating or powered front rigging, a 4-way switch positioning mode associated with powered seating or powered front rigging, and an environmental control unit (ECU) mode. Other embodiments may include any combination of these modes and additional modes.

The graphic display 126, for example, may include a 128× 64 pixel display. A screen on the graphic display 126 may include about five or six lines of text by about 32 characters, about two large icons (e.g., 64×64 pixels icons), about eight small icons (e.g., 32×32 pixel icons), or various combinations thereof. Of course, larger or smaller icons may also be used in various combinations.

The joystick control 128, for example, may include a proportional analog joystick. The joystick control 128, for example, may be used for directional control for menu or icon navigation, setting or modifying a programmable parameter, saving a selected programmable parameter value, directional control for driving the power driven wheelchair, positional control of a selected user support surface, and other selection-type functions when directional or positional control is not required. The joystick control 128 is an example of a screen navigation control. The speed control 130, for example, may include a rotary potentiometer. Turning the speed control 130 between counter-clockwise and clockwise limits adjusts the maximum speed of the power driven wheelchair in relation to operation using the joystick control 128. The mounting hub 132, for example, may be inserted in a mating receptacle on the power driven wheelchair to mount the system controller 32.

Figure 9:
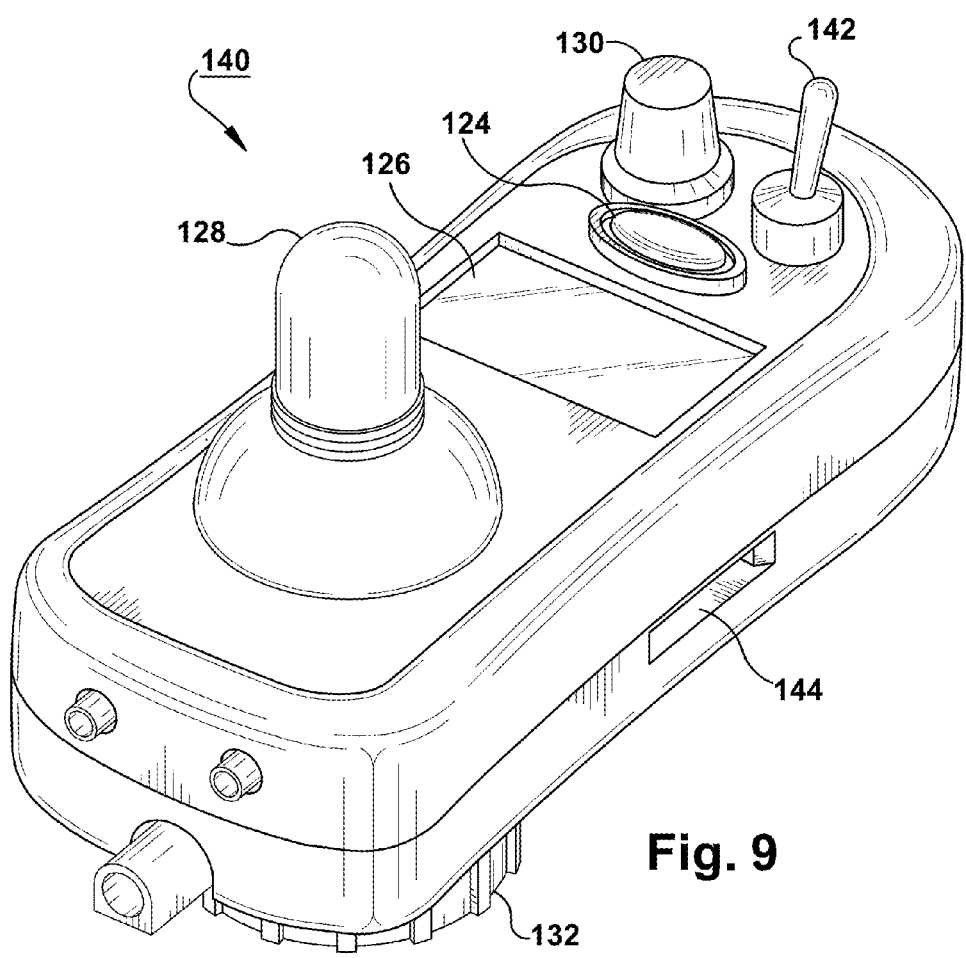

With reference to FIG. 9, another exemplary embodiment of a system controller 140 may include a mode select switch 124, a graphic display 126, a joystick control 128, a speed control 130, a mounting hub 132, a power/drive select switch 142, and a removable memory card slot 144. This system controller 140 may be referred to as a personalized switch rear-mount (PSR) joystick model or simply a PSR model. Generally, the components of the PSR model have the same functional characteristics as the components described above for the MPJ model (FIG. 8). The PSR model provides an alternate construction of a system controller.

Figure 10:
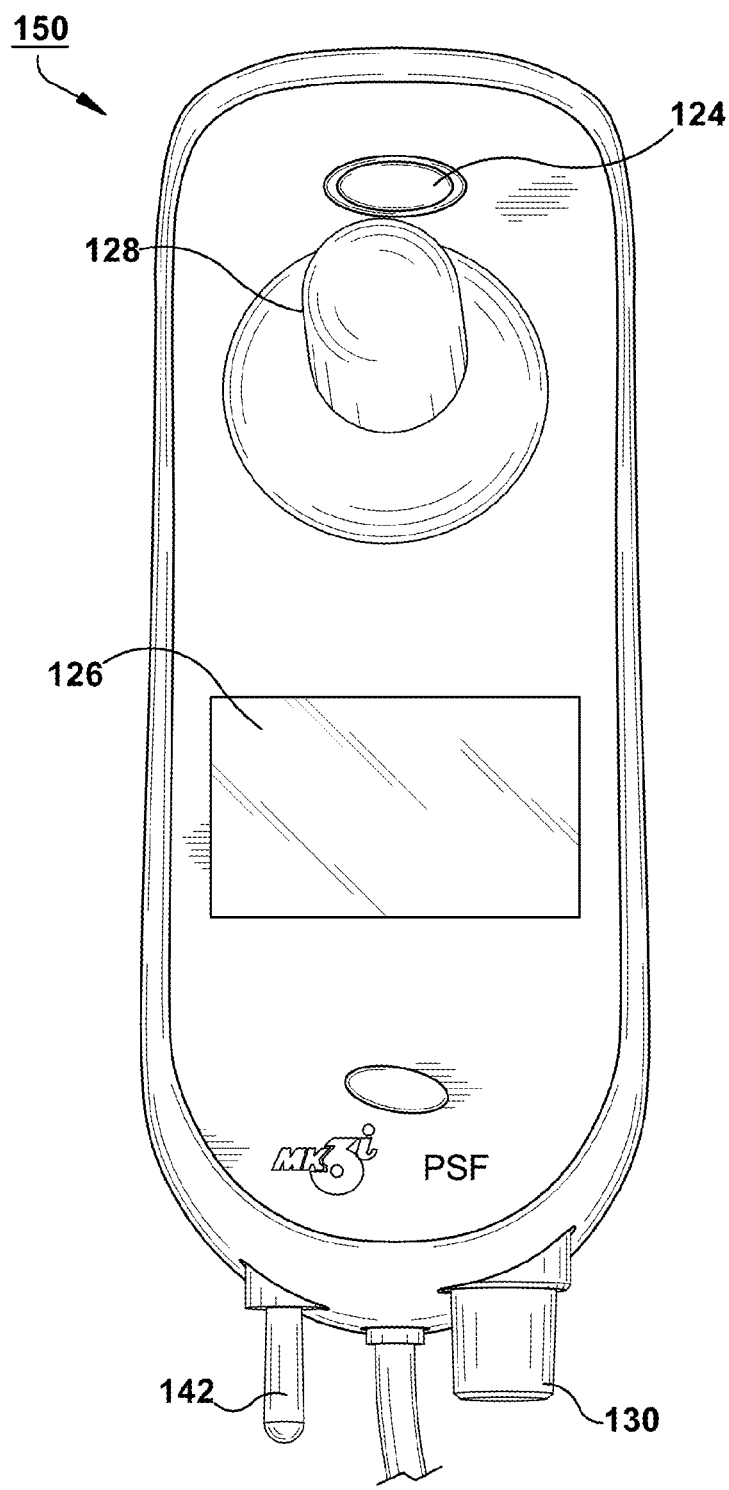

With reference to FIG. 10, still another exemplary embodiment of a system controller 150 may include a mode select switch 124, a graphic display 126, a joystick control 128, a speed control 130, and a power/drive select switch 142. This system controller 150 may be referred to as a personalized switch front-mount (PSF) joystick model or simply a PSF model. A mounting hub (not shown) may also be provided on the PSF model for mounting the system controller 146. The PSF model may also include a removable memory card slot (not shown) for receiving a portable storage medium (FIG. 4, 86), such as a removable memory card. Generally, the components of the PSF model have the same functional characteristics as the components described above for the MPJ model (FIG. 8). The PSF model provides an alternate construction of a system controller.

Figure 11:
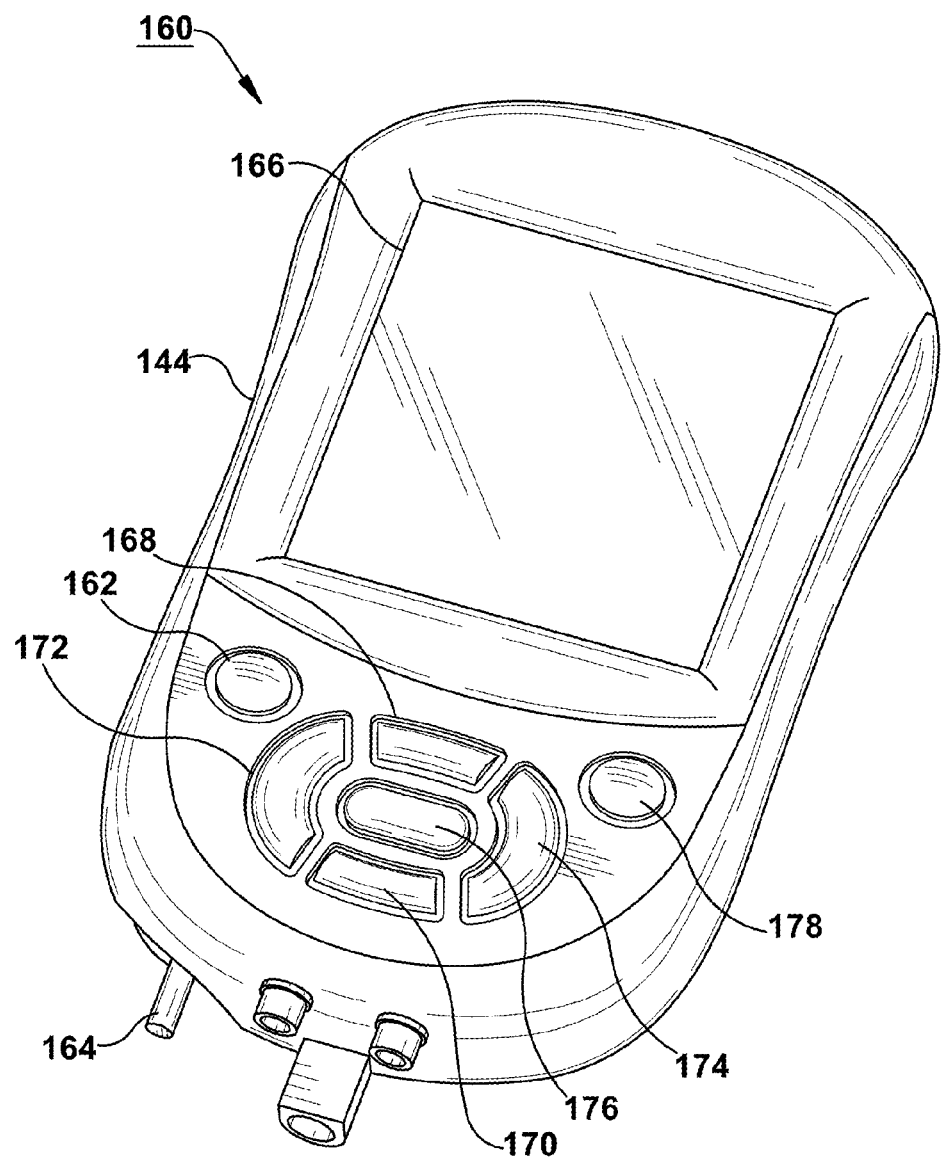

With reference to FIG. 11, yet another exemplary embodiment of a system controller 160 may include a removable memory card slot 144, an info switch 162, a power switch 164, a graphic display 166, an up direction switch 168, a down direction switch 170, a menu/left direction switch 172, a right direction switch 174, a select switch 176, and a save switch 178. This system controller 160 may be referred to as a DISPLAY model. The DISPLAY model may also include a mounting hub (not shown) for mounting the system controller 160. Generally, the removable memory card slot 144 has the same functional characteristics as described above for the MPJ model (FIG. 8).

The info switch 162, for example, may include a momentary pushbutton switch. Activation of the info switch 162 may cause the controller 160 to access and display diagnostic information. In this case, depending on a programming mode the wheelchair is in, certain information from diagnostic information file(s) may be provided on the graphic display 166. The diagnostic information provided may be related in some way to a fault code that is displayed or selected at or about the time the info switch 162 was activated. For example, information retrieved from diagnostic information file(s) may be context-sensitive with respect to an active screen object, such as a current fault code or list of fault codes, or a current error message. This provides information about a specific error condition that is currently being analyzed. The context-sensitive diagnostic information may provide more detailed explanation about wheelchair component operating conditions that produced the fault code and/or present trouble shooting procedures that may be helpful in diagnosing the root cause of a wheelchair malfunction that produced the fault code. In additional embodiments, retrieval of specific information from the diagnostic information file(s) may be menu-driven, topic-driven, or driven by another suitable means.

The power switch 164, for example, may include a two position toggle switch with on and off positions. When the power switch 164 is set to the "on" position the power driven wheelchair is powered on. When the power switch 164 is switched from the "on" position to the "off" position, for example, the power driven wheelchair may begin a predetermined shutdown sequence. The graphic display 166, for example, is a 160×160 pixel display. A screen on the graphic display 166 may include about twelve lines of text by about 40 characters, about four large icons (e.g., 64×64 pixels icons), about 25 small icons (e.g., 32×32 pixel icons), or various combinations thereof. Of course, larger or smaller icons may also be used in various combinations.

The up, down, menu/left, and right direction switches 168, 170, 172, 174, for example, may include momentary pushbutton switches. The up, down, menu/left, and right direction switches 168, 170, 172, 174 may be used for directional control for menu or icon navigation, setting or modifying a programmable parameter, positional control of a selected user support surface, and other selection-type functions when directional or positional control is not required. For certain display screens, activation of the menu/left direction switch 172 may cause the controller 160 to present the previous menu on the graphic display 166. The up, down, menu/left, and right direction switches 168, 170, 172, 174, in any combination, are examples of a screen navigation control. In another embodiment, the up, down, menu/left, and right direction switches 168, 170, 172, 174, for example, may also be used for directional control for certain power driven wheelchair driving operations.

The select switch 176, for example, may include a momentary pushbutton switch. The select switch 176 may be used for selection of menu items or icons. The save switch 178, for example, may include a momentary pushbutton switch. The save switch 178 may be used for saving a displayed value of a selected programmable parameter as the current value for the parameter. The mode select, drive select, and speed control functions described above for the MPJ model (FIG. 7), for example, may be implemented through the graphic display 166, navigational control using the up, down, menu/left, and right direction switches 168, 170, 172, 174, and activation of the select or save switches 176, 178.

Figure 12:
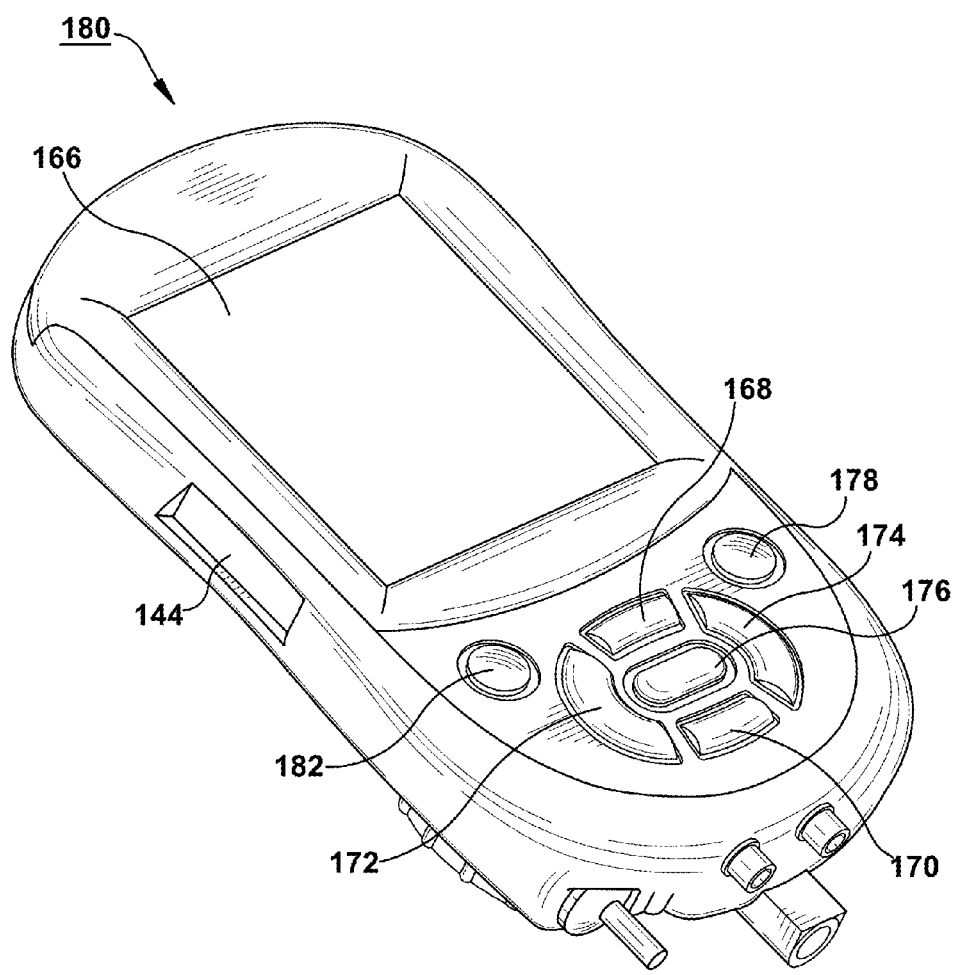
FIG. 12 is a perspective view of an exemplary embodiment of a programmer used in conjunction with related embodiments of power driven wheelchairs.

With reference to FIG. 12, an exemplary embodiment of a programmer 180 may include a removable memory card slot 144, a graphic display 166, an up direction switch 168, a down direction switch 170, a menu/left direction switch 172, a right direction switch 174, a select switch 176, a save switch 178, and a power/info switch 182. Generally, the components of the programmer 180 have the same functional characteristics as the components described above for the DISPLAY model of the system controller 160 (FIG. 11). However, the programmer 180 may combine the power and info functions in the power/info switch 182. Notably, the programmer 180 may not require the speed control functionality of the DISPLAY model. The programmer 180 may also not require other functionality of the DISPLAY model in relation to driving the power driven wheelchair or positioning the user support surfaces.

The power/info switch 182, for example, may include a momentary switch. Pressing and holding the power/info switch 182 for at least a predetermined time (e.g., three seconds) may provide control of toggling power on and power off functions. For example, if the programmer 180 is powered off, pressing and holding the power/info switch 182 for at least the predetermined time may cause the programmer 180 to be powered on. Similarly, if the programmer 180 is powered on, pressing and holding the power/info switch 182 for at least the predetermined time may cause the programmer 180 to begin a predetermined shutdown sequence. The info function may be provided by pressing and releasing the power/info switch 182 within a predetermined time (e.g., two seconds). The characteristics of the info function of the power/info switch 182 are otherwise the same as those described above for the info switch 162 of the DISPLAY model of the system controller 160 (FIG. 11).

Software Updates

Figure 7:
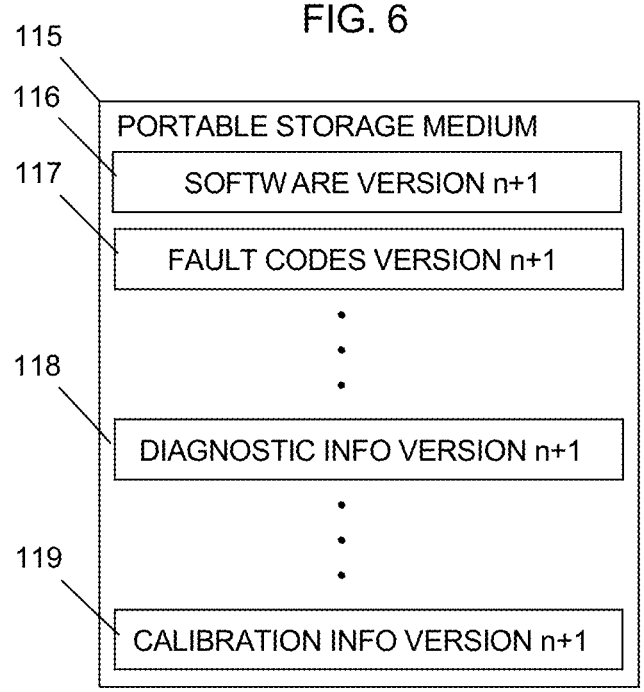
FIG. 7 is a block diagram of an exemplary embodiment of a portable storage medium associated with a system controller or a programmer.
Figure 13:
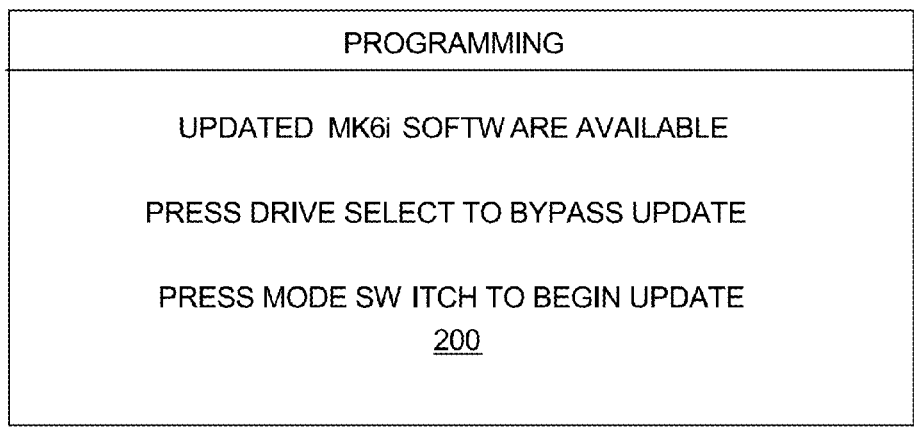
FIG. 13 is an exemplary display screen associated with updating one or more software components associated with a power driven wheelchair.

As already discussed with reference to FIGS. 6 and 7, the use of portable memory media enables new versions of operating software, additional programmable parameters and features, as well as revised diagnostic, help, and calibration data to be downloaded into the on-board memory device. With reference to FIG. 13, an exemplary display screen 200 on a system controller or programmer is shown that alerts a user that updated software is available and provides instructions as to how to either bypass the update by pressing drive select or begin the update by pressing the mode select switch.

Figure 14:
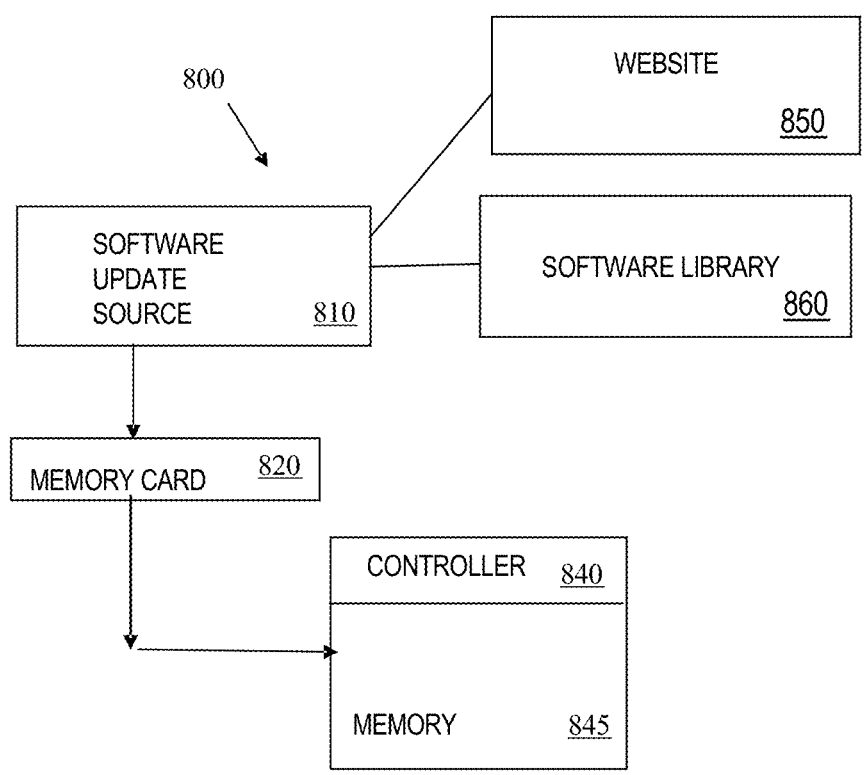
FIG. 14 a schematic block diagram an exemplary software update detection system associated with a power driven wheelchair.

FIG. 14 is a functional block diagram outlining various components included in one software update system 800. A wheelchair controller 845 includes on-board memory 845 that stores operating instructions, diagnostic information, and calibration information for the wheelchair to which it is coupled. The controller accepts a memory card 820 and is capable of replacing the information stored in on-board memory with one or more software elements stored on the memory card. The contents of the memory card 810 can be periodically updated by accessing a software update source 810 such as a computer or specialized programmer that is capable of receiving the memory card and transferring to the memory card software elements from a remote source, such as a website 850 or a software library 860.

Figure 15:
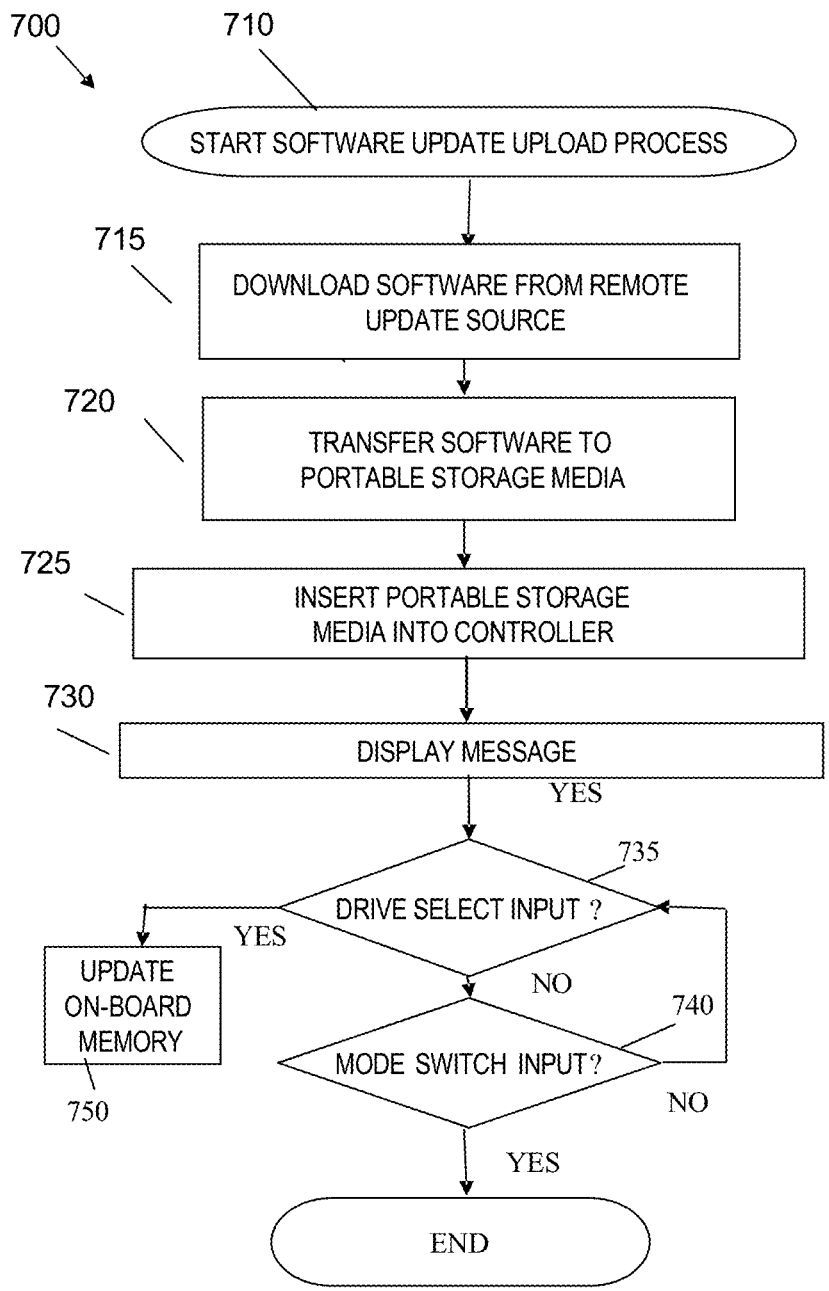
FIG. 15 is a flowchart of an exemplary software update upload process associated with updating one or more software components associated with a power driven wheelchair.

FIG. 15 is a flowchart that outlines an exemplary software update procedure 700 for updating software elements on the memory card from the remote source. At 710 the procedure is initiated, possibly by detection by the software update source of a memory card or user actuable input on the software update source. At 715, software is downloaded from a remote update source such as a website or software library and at 720 the updated software is transferred to the portable storage media. At 725, the portable storage media is inserted in a wheelchair controller and at 730, the controller's display prompts the user with the software update screen 200 shown in FIG. 13. At 735 if the drive select input is detected, on-board memory is updated at 750. If the mode switch input is detected at 740, the procedure ends.

Figure 16:
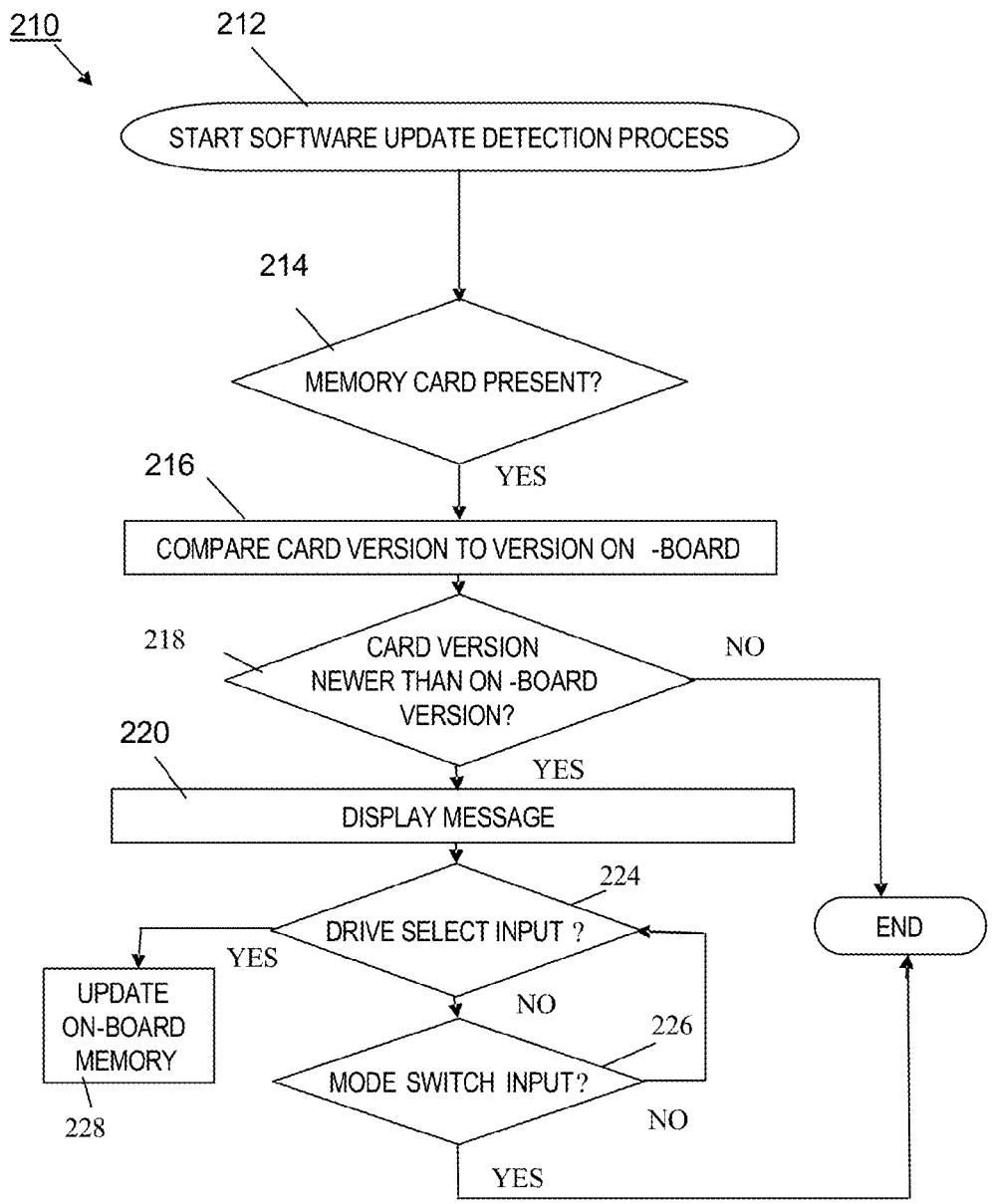
FIG. 16 is a flowchart of an exemplary software update detection process associated with updating one or more software components associated with a power driven wheelchair.
Figure 18A:
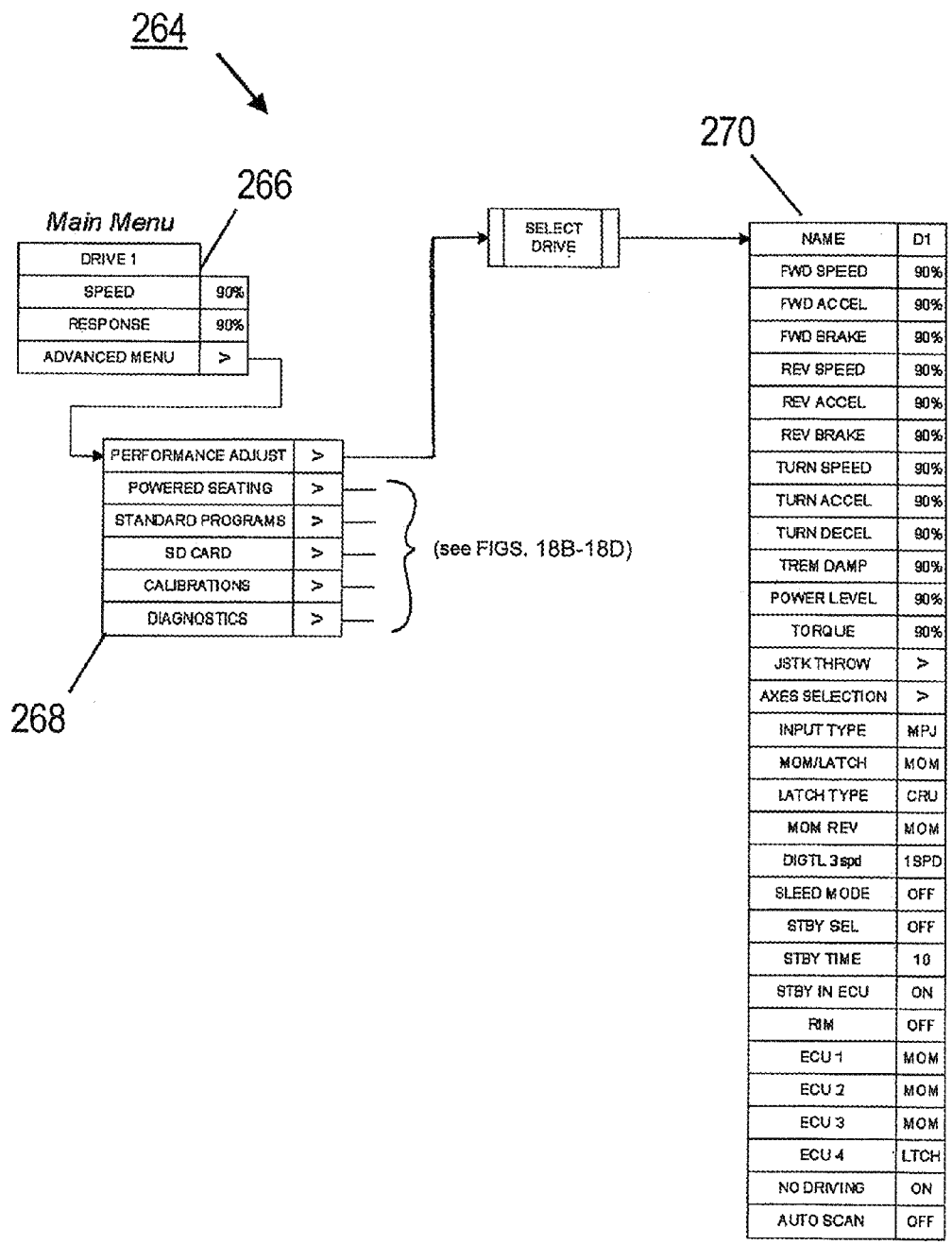
FIG. 18A is a portion of an exemplary menu hierarchy for a programming mode associated with operation or support of a power driven wheelchair.
Figure 18B:
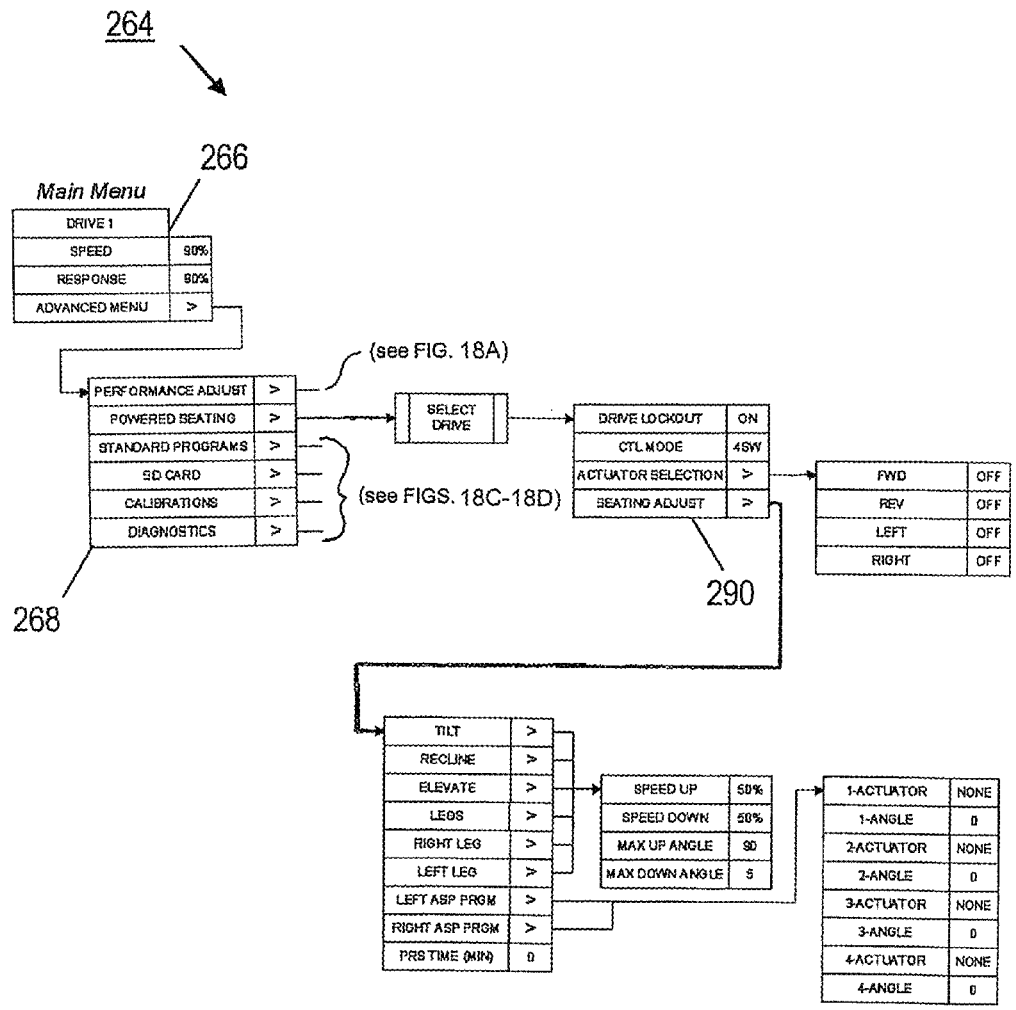
FIG. 18B is another portion of the exemplary menu hierarchy for a programming mode associated with operation or support of a power driven wheelchair.
Figure 18C:
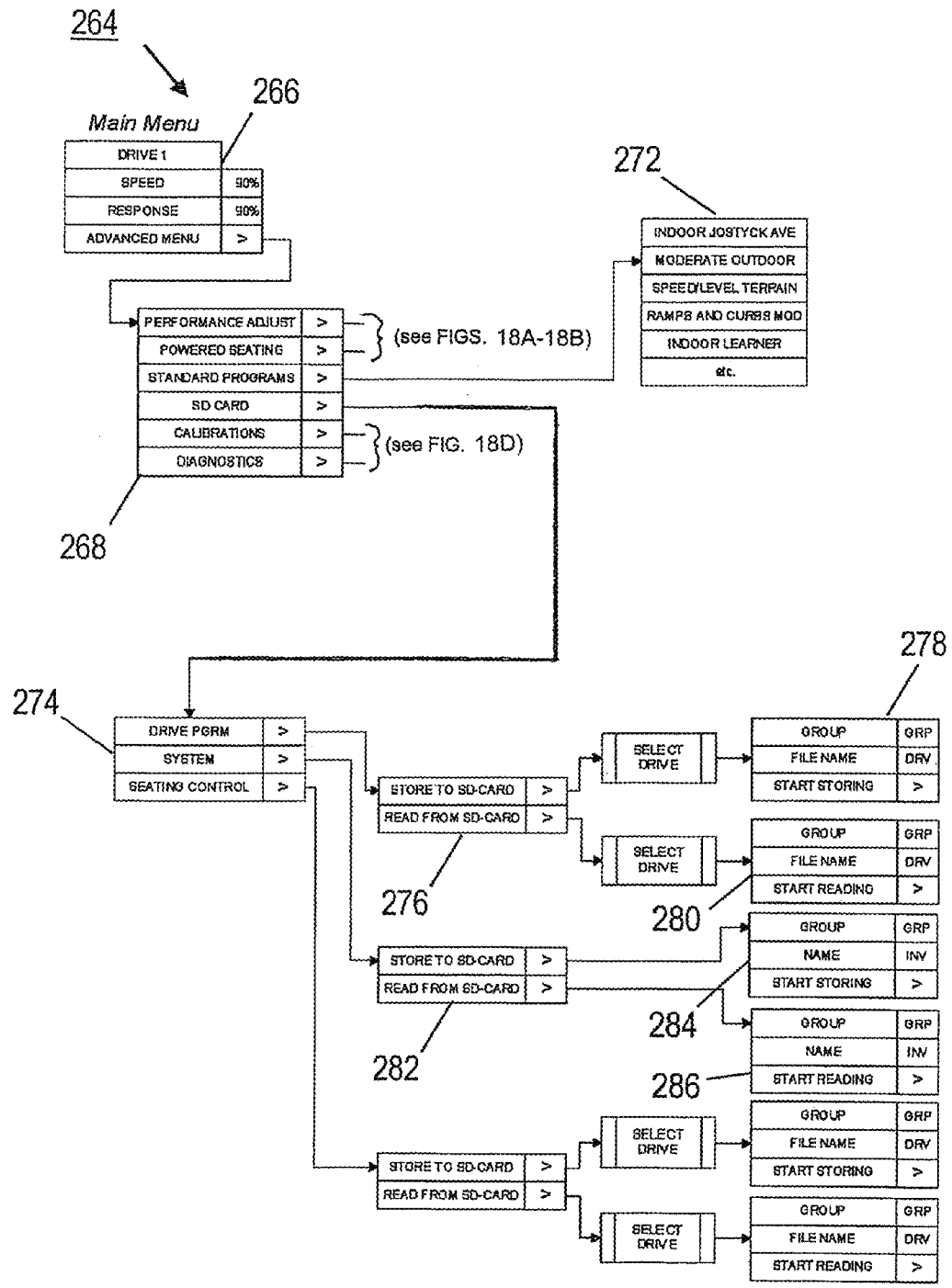
FIG. 18C is another portion of the exemplary menu hierarchy for a programming mode associated with operation or support of a power driven wheelchair.
Figure 18D:
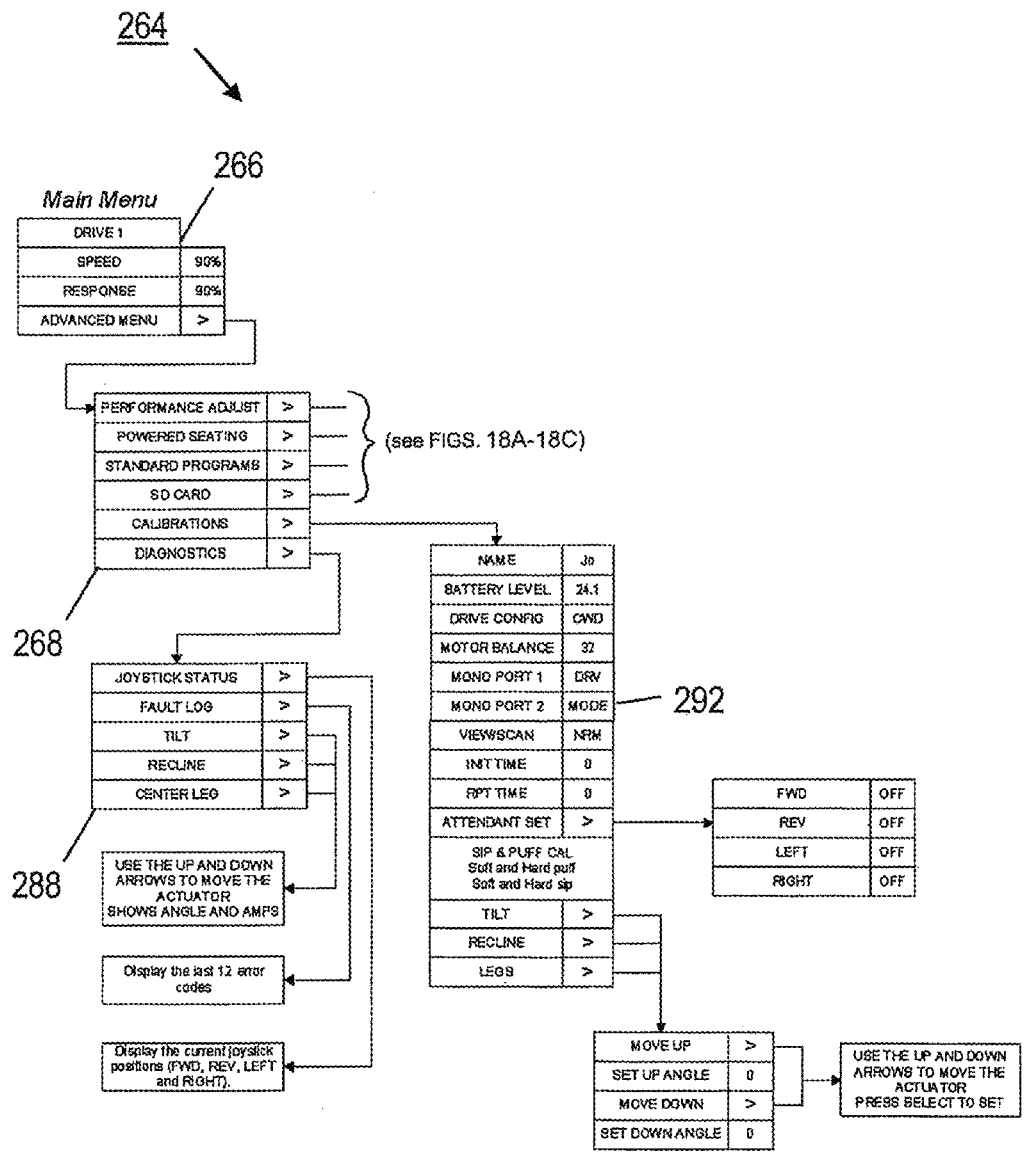
FIG. 18D is another portion of the exemplary menu hierarchy for a programming mode associated with operation or support of a power driven wheelchair.

A procedure 210 that can be used to implement the software update feature is outlined in FIG. 16. A software update detection process starts at 212 and at 214 whenever a memory card or other portable storage media is detected, the version number associated with the stored information on the memory card is compared to a version number associated with the information stored on the on-board memory. At 218, if the version number of the information on the memory card is not higher than that stored on-board, the procedure ends. If the version number of the information on the card is higher, at 220 the message shown in FIG. 13 is displayed. At 224 if a drive select input is detected, the procedure ends. Otherwise, at 226 if a mode switch actuation is detected, an update process is performed at 228 in which the information stored on the memory card is stored in place of the information currently stored in on-board memory.

Programming Menu Operation

FIGS. 17 and 18 schematically depict a main menu display screen and a menu hierarchy, respectively, that provide an overview of various parameter programming options that are available and the logical structure of those options. FIG. 15 shows an exemplary advanced menu 268 display screen on a system controller or programmer from which a user can begin the procedure of setting or modifying one or more programmable parameters. The advanced menu 268 also includes seven programming options: performance adjust, standard programs, memory card, powered seating, settings, calibrations, and diagnostics that can be selected by, for example, moving the joystick control to the right or by activating a select switch. Two of these programming options, namely calibrations and diagnostics will be dealt with in detail herein. The other five options are described in more detail in the patents and patent applications referenced in the cross reference section of the present application.

As will be described in more detail below, an individual menu item may be selected by navigating up or down the list of menu items. The display, however, may not be able to display all of the menu items together. After the last menu item selected, for example, the display may continue to scroll to the beginning of the list with additional down activations. Conversely, if the last menu item is selected, additional down activations may have no effect and up activations may be required to move up the menu list. Of course, up or down activations using the joystick control or up and down direction switches may be used to navigate the list of menu items.

With reference to FIG. 16, an exemplary programming mode menu hierarchy 264 for setting or modifying programmable parameters associated with operation and support of a power driven wheelchair begins with a main menu 230. Performance adjust 270 may be selected after from the main menu 230. A standard programs menu 272 may be selected from the main menu 230. An SD card menu 274 may also be selected from the main menu 230. Additional menus or lists, such as a powered seating menu 290 may also be selected from the main menu 230. A calibrations menu 292 and advanced diagnostics menu 288 will be described in more detail below.

Figure 19:
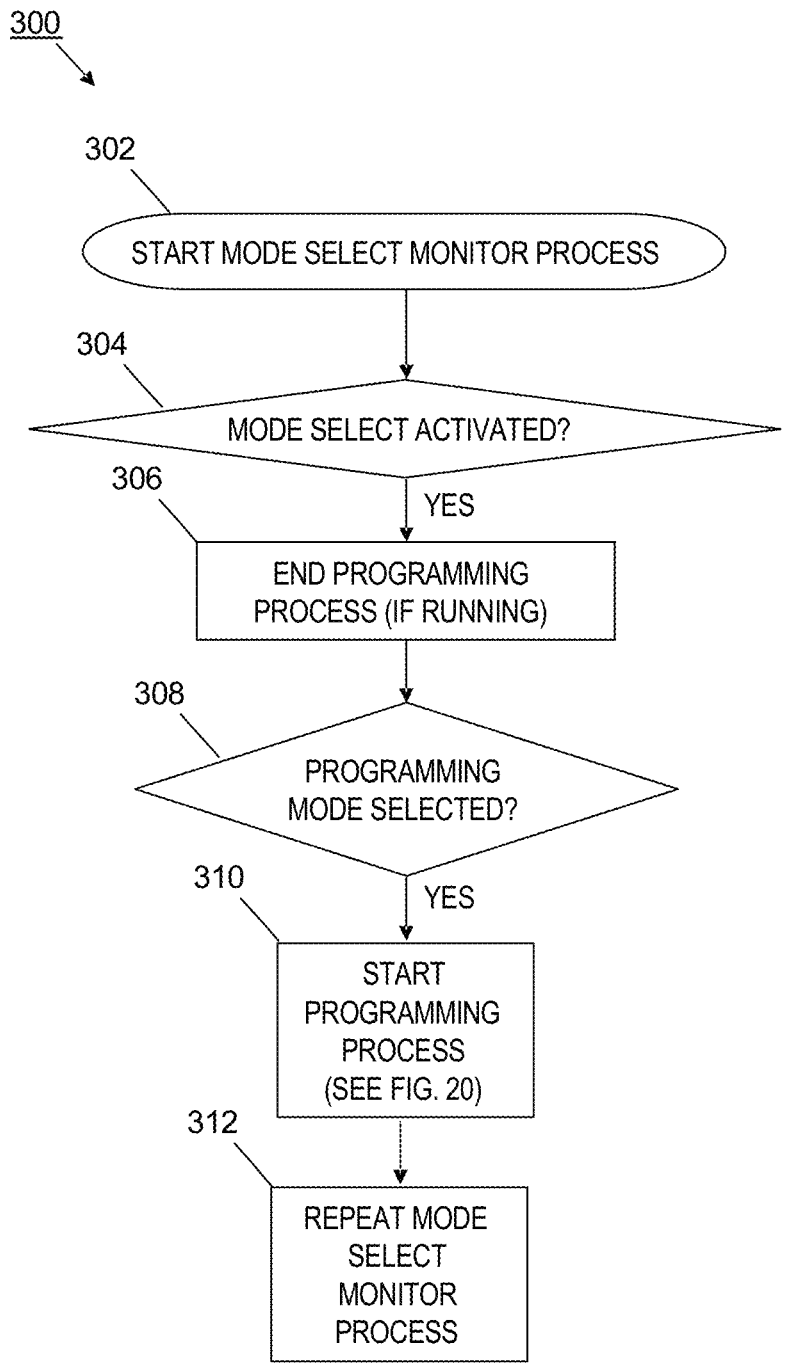
FIG. 19 is a flow chart of an exemplary mode select monitor process associated with setting or modifying programmable parameters associated with operation and support of a power driven wheelchair.

With reference to FIG. 19 an exemplary mode select monitor procedure 300 associated with setting or modifying programmable parameters begins at 302 where the procedure starts. At 304, the procedure may detect activation of a mode select switch 124 (FIG. 8). In another embodiment, the process may periodically check the condition of the mode select switch. If the mode switch was activated, system programs that are running for a current mode, such as a driving mode, may be suspended or ended so that a system mode can be selected (306). After a mode is selected, suspended system programs that are compatible with the selected mode may be continued while those that are not compatible may be ended. If the programming mode is selected in 308, the programming process (see FIG. 20) may be started in 310. If the programming process was suspended in 306, it may be continued in 310. Next, at 312, the mode select monitor process is repeated.

Figure 20:
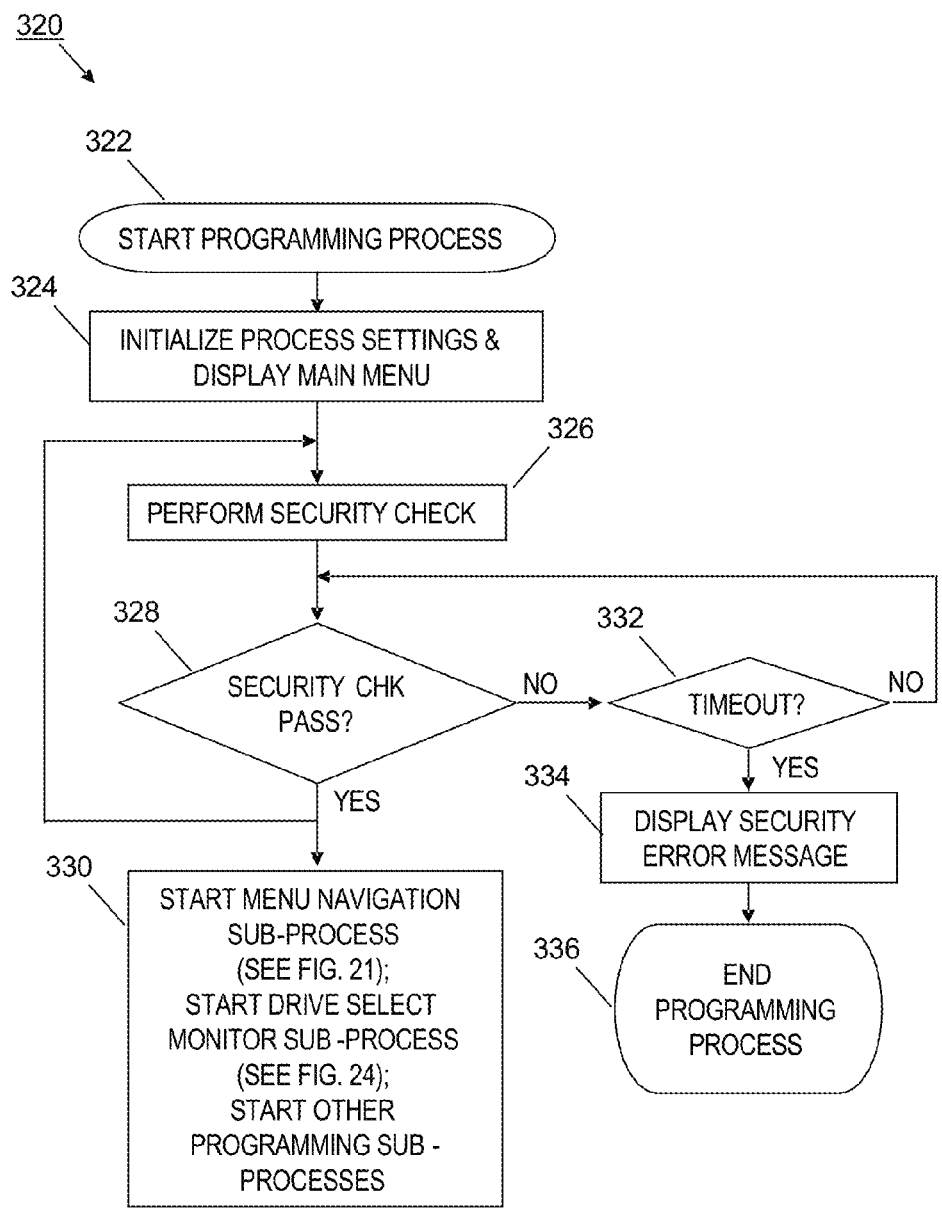
FIG. 20 is a flow chart of an exemplary programming process associated with setting or modifying programmable parameters associated with operation and support of a power driven wheelchair.

With reference to FIG. 20, an exemplary programming process 320 associated with setting or modifying programmable parameters begins at 322 where the process starts. At 324, programming process settings may be initialized and a main menu may be displayed on a graphic display (e.g., FIG. 8, 124). A security check may be performed prior to advancing from the main menu to prevent unauthorized setting or modifying of programmable parameters (326). This security check is optional and not required, particularly in regard to the programming functions. It is described here because in certain applications users, attendants, and technicians may have different privileges with regard to operation and support of the power driven wheelchair. A security check facilitates limiting access to one or more features provided in the power driven wheelchair. For example, a security check may be used to limit access to programming functions to the technicians.

In one embodiment, the security check, for example, may include a hardware or software key associated with insertion of an appropriate portable storage medium 86 (FIG. 4), such as a removable memory card, in a storage medium interface (FIG. 4), such as removable memory card slot 144 (FIG. 9). In another embodiment, the security check, for example, may include a hardware or software key associated with connection of the programmer 60 (FIG. 3) to the system controller 32 (FIG. 3). If the programmer is being used, the security check may include a key status signal transmitted by the programmer to the system controller.

Figure 26:
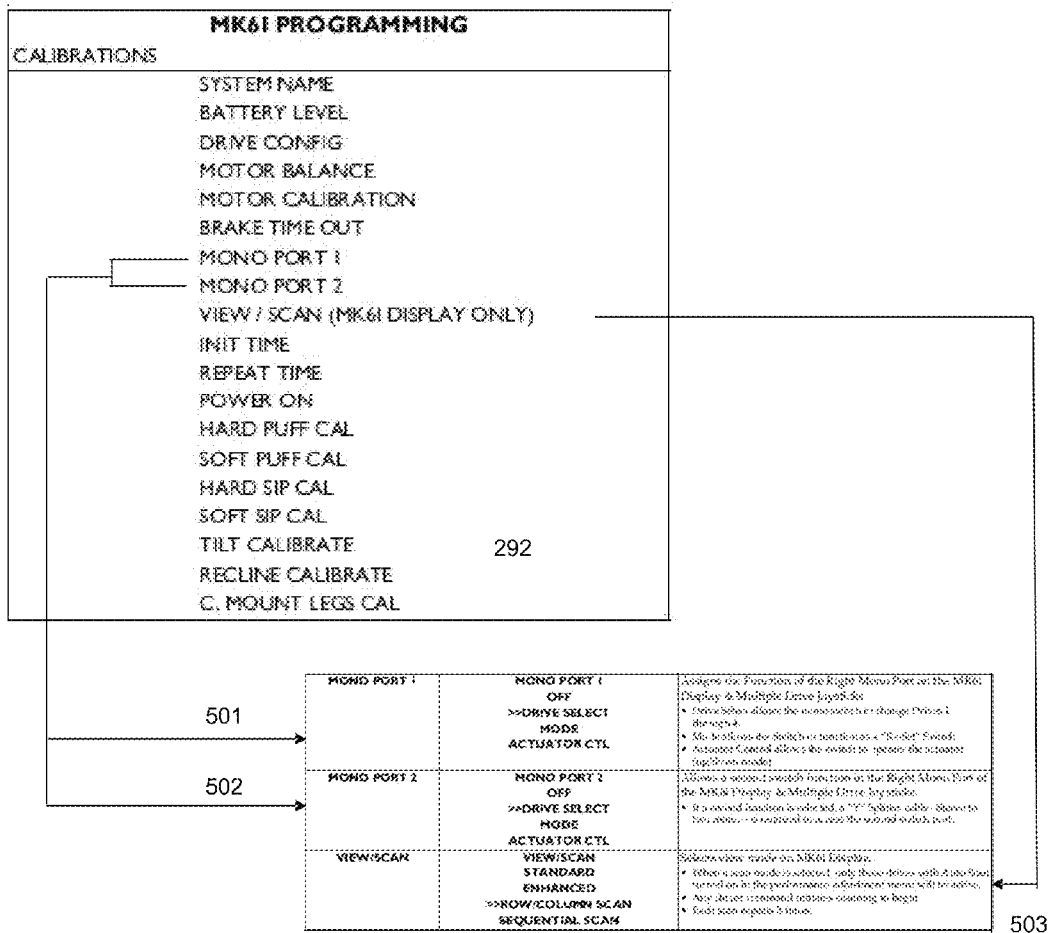

If the security check at 328 passes, the programming process returns to 326 to repeat the security check and also advances to 330 to start or continue a menu navigation sub-process (see FIG. 21) and to start or continue a drive select monitor sub-process (see FIG. 26). At 330, other programming sub-processes may also be started or continued. The security check, for example, may be repeated about every ten milliseconds while the programming process is running. In additional embodiments, the security check may be repeated at a different periodic interval. Moreover, the interval between successive security checks need may be aperiodic, rather than periodic. Since 326-330 are repeated, after the initial successful pass through the security check the menu navigation sub-process, drive select monitor sub-process, and any other programming sub-process are merely continued in 330 after additional successful passes through the security check.

If the security check does not pass at 328, the programming process advances to 332 to determine if a predetermined timeout period has expired. If the timeout period is not expired, the process returns to 328 to determine if the security check passed. If the timeout period is expired at 332, a security error message may be displayed (334) and the programming process is ended (336).

Figure 21:
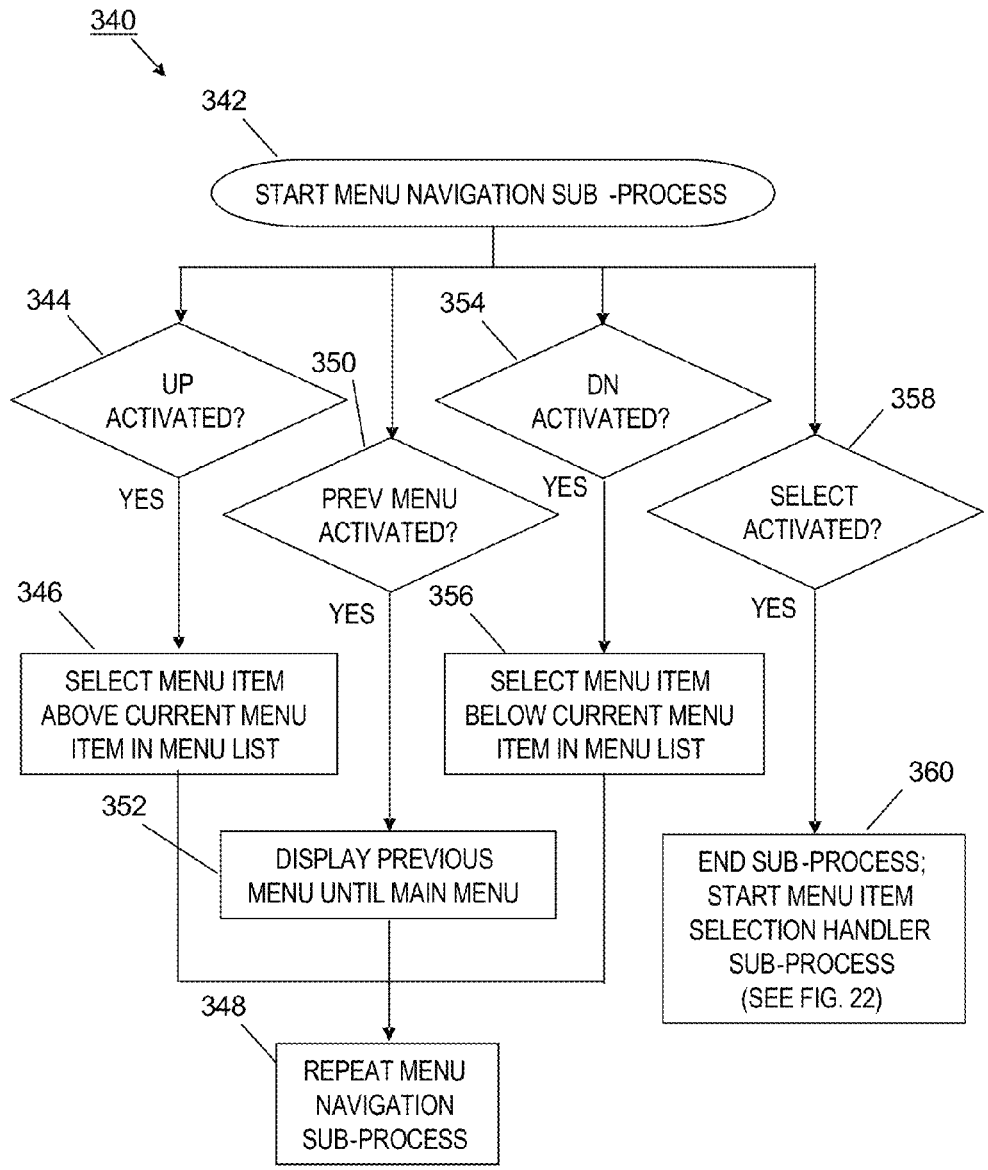
FIG. 21 is a flow chart of an exemplary menu navigation sub-process associated with setting or modifying programmable parameters associated with operation and support of a power driven wheelchair.

With reference to FIG. 21, an exemplary menu navigation sub-process 340 associated with setting or modifying programmable parameters begins at 342 where the sub-process starts. At 344, the process may detect an up activation. For example, moving a joystick control (e.g., FIG. 8, 128) forward or pressing an up direction switch (e.g., FIG. 11, 168) may provide an up activation. If an up activation is detected, the menu item above the current menu item may be selected and highlighted to indicate the newly selected menu item (346). The previously highlighted menu item may be returned to normal text. Next, at 348, the menu navigation sub-process may be repeated.

At 350, the process may detect a previous menu activation. For example, moving a joystick control (e.g., FIG. 8, 128) to the left or pressing a menu/left direction switch (e.g., FIG. 11, 172) may provide a previous menu activation. If a previous menu activation is detected, the previous menu in a menu hierarchy (e.g., FIG. 16, 264) may be displayed (352), unless, for example, the current menu is the main menu. Next, at 348, the menu navigation sub-process may be repeated with respect to the previous menu.

At 354, the process detects a down activation. For example, moving a joystick control (e.g., FIG. 8, 128) backward or pressing a down direction switch (e.g., FIG. 11, 174) may provide a down activation. If a down activation is detected, the menu item below the current menu item may be selected and highlighted to indicate the newly selected menu item (356). The previously highlighted menu item may be returned to normal text. Next, at 348, the menu navigation sub-process may be repeated.

At 358, the process detects a select activation. For example, moving a joystick control (e.g., FIG. 6, 106) to the right or pressing a select switch (e.g., FIG. 11, 174) may provide a select activation. If a select activation is detected, the menu navigation sub-process may be ended and a menu item selection handler sub-process (see FIG. 19) may be started.

In another embodiment, the menu navigation sub-process 340 may periodically check the condition of the corresponding components associated with an up activation, previous menu activation, down activation, and select activation in a loop to determine if corresponding activations occur.

Figure 22:
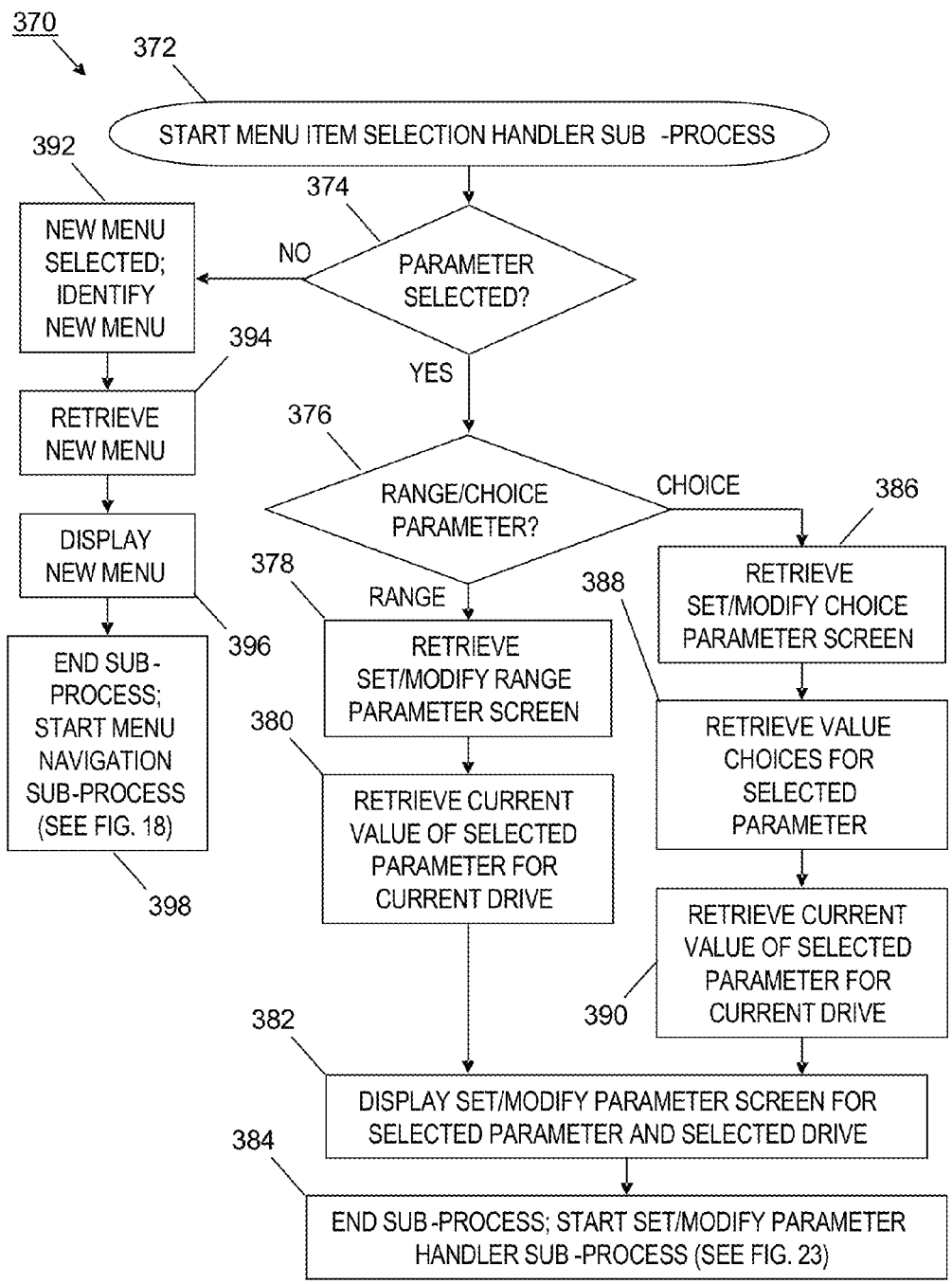
FIG. 22 is a flow chart of an exemplary menu item selection handler sub-process associated with setting or modifying programmable parameters associated with operation and support of a power driven wheelchair.

With reference to FIG. 22, an exemplary menu item selection handler sub-process 370 associated with setting or modifying programmable parameters begins at 372 where the sub-process starts. At 374, if the current menu item selection is a programmable parameter, the sub-process may advance to 376 to determine whether the programmable parameter is a "range" parameter or a "choice" parameter. A "range" parameter is a programmable parameter that may be set or modified to a value within a predetermined range of values. A "choice" parameter is a programmable parameter that may be set to any value within a list of value choices. If the selected programmable parameter is a "range" parameter, a set/modify range parameter screen may be retrieved (378). Next, a current value for the selected programmable parameter associated with a currently selected drive may be retrieved (380). The currently selected drive may be based on, for example, a default drive selection or activations of the power/drive select switch (e.g., FIG. 8, 122). The currently selected drive may also be based on drive selection using a drive select screen and corresponding menu navigation (see FIG. 19) to select the drive. The currently selected drive corresponds to a programmable parameter set from a plurality of programmable parameters. At 382, the set/modify parameter screen with the current value for the selected programmable parameter and selected drive may be displayed on a graphic display (e.g., FIG. 8, 126). Next, the menu item selection handler sub-process may be ended and the set/modify parameter handler sub-process (see FIG. 23) may be started.

At 376, if the selected programmable parameter is a "choice" parameter, a set/modify choice parameter screen may be retrieved (386). Then, values for each item in the list of choices for the selected programmable parameter may be retrieved (388). Next, a current value for the selected programmable parameter associated with a currently selected drive may be retrieved (390). At this point, the process advances to 382 and continues as described above.

At 374, if the current menu item selection is not a programmable parameter, a new (i.e., lower level) menu was selected and the sub-process may advance to 392 to identify the new menu. Next, the new menu may be retrieved (394). At 396, the new menu may be displayed. Next, the menu item selection handler sub-process may be ended and the menu navigation sub-process (see FIG. 18) may be started.

Figure 23:
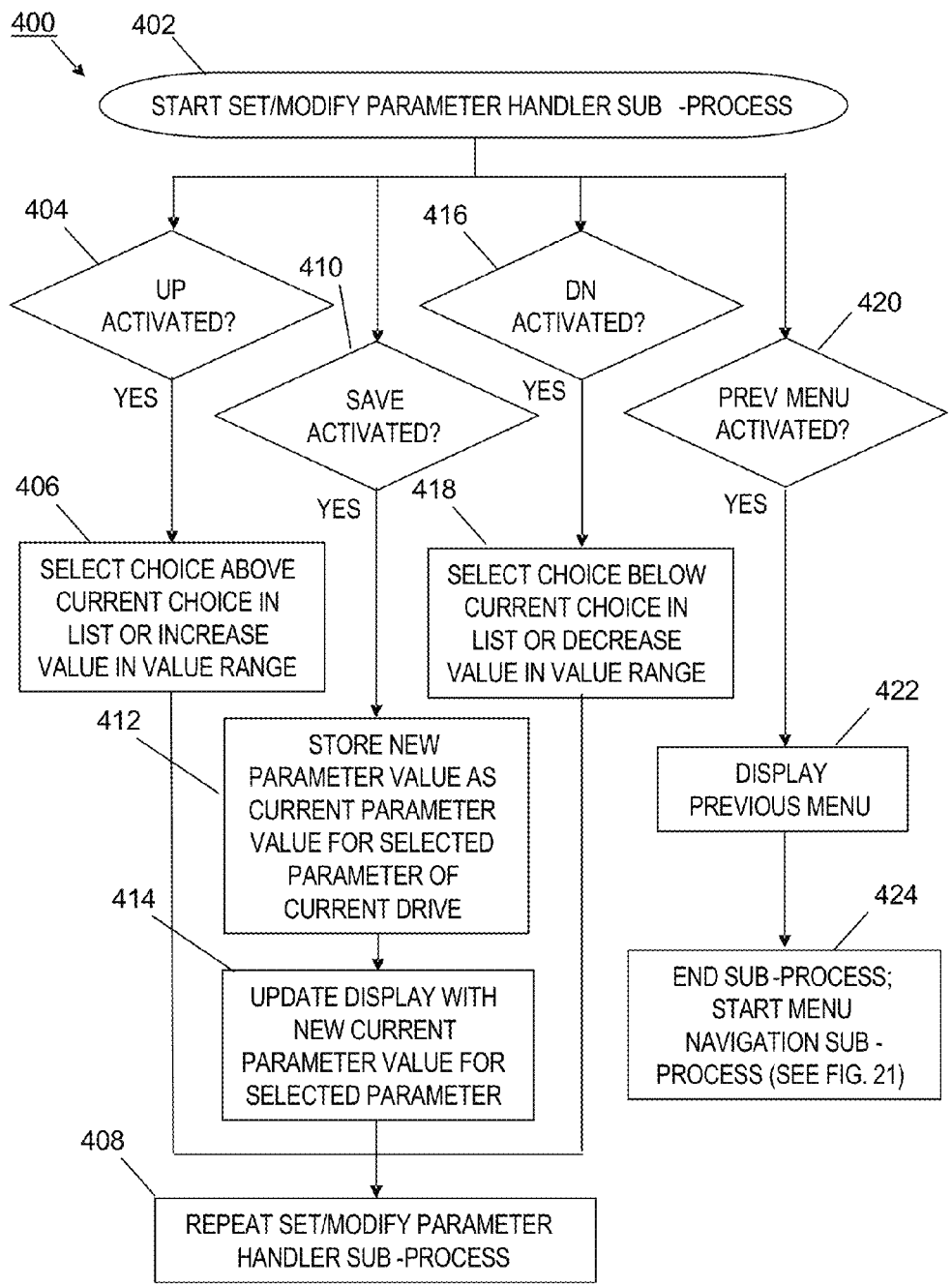
FIG. 23 is a flow chart of an exemplary set/modify parameter handler sub-process associated with setting or modifying programmable parameters associated with operation and support of a power driven wheelchair.

With reference to FIG. 23, an exemplary set/modify parameter handler sub-process 400 associated with setting or modifying programmable parameters begins at 402 where the sub-process starts. At 404, the process may detect an up activation. If an up activation is detected, the parameter value choice above the current parameter value choice may be selected and highlighted to indicate the newly selected parameter value from a list of parameter value choices (i.e., when the selected programmable parameter is a "choice" parameter) (406). Alternatively, when the selected programmable parameter is a "range" parameter, if an up activation is detected, the selected parameter value may be increased to the next predetermined higher value within the range of values for the corresponding programmable parameter (406). For the "range" parameter adjustment, a MORE screen object may be highlighted to indicate the last adjustment made to the selected programmable parameter was based on an up activation. Next, at 408, the set/modify parameter handler sub-process may be repeated.

At 410, the process may detect a save activation. For example, moving a joystick control (e.g., FIG. 8, 128) to the right or pressing a save switch (e.g., FIG. 11, 178) may provide a save activation. If a save activation is detected, the new parameter value may be stored as the current parameter value for the selected programmable parameter of the currently selected drive (412). At 414, the set/modify parameter display may be updated with the new current parameter value for the selected programmable parameter of the currently selected drive. Next, at 408, the set/modify parameter handler sub-process may be repeated.

At 416, the process may detect a down activation. If an down activation is detected, the parameter value choice below the current parameter value choice may be selected and highlighted to indicate the newly selected parameter value from the list of parameter value choices (i.e., when the selected programmable parameter is a "choice" parameter) (406). Alternatively, when the selected programmable parameter is a "range" parameter, if a down activation is detected, the selected parameter value may be decreased to the next predetermined lower value within the range of values for the corresponding programmable parameter (406). For the "range" parameter adjustment, a LESS screen object may be highlighted to indicate the last adjustment made to the selected programmable parameter was based on a down activation. Next, at 408, the set/modify parameter handler sub-process may be repeated.

At 420, the process detects a previous menu activation. If a previous menu activation is detected, the previous menu in a menu hierarchy (e.g., FIG. 16, 264) may be displayed (422), unless, for example, the current menu is the main menu. Next, at 424, the set/modify parameter handler sub-process may be ended and a menu navigation sub-process (see FIG. 19) may be started.

In another embodiment, set/modify parameter handler sub-process 400 may periodically check the condition of the corresponding components associated with an up activation, save activation, down activation, and previous menu activation in a loop to determine if corresponding activations occur.

Figure 24:
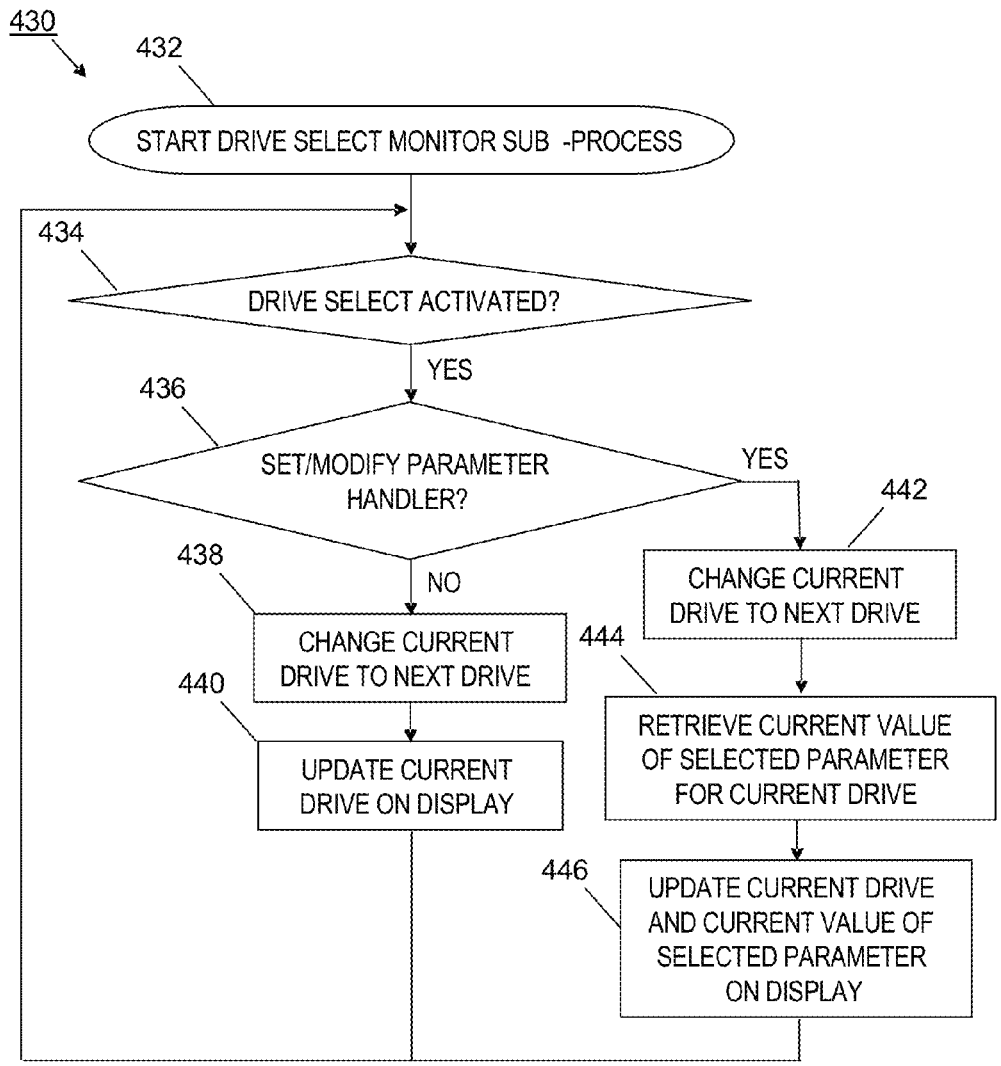
FIG. 24 is a flow chart of an exemplary drive select monitor sub-process associated with setting or modifying programmable parameters associated with operation and support of a power driven wheelchair.

With reference to FIG. 24, an exemplary drive select monitor sub-procedure 430 associated with setting or modifying programmable parameters begins at 432 where the sub-procedure starts. At 434, the sub-procedure detects a drive select activation of a power/drive select switch (e.g., FIG. 6, 102). In another embodiment, the procedure may periodically check the condition of the drive select position of the power/drive select switch. If there is a drive select activation, the sub-procedure determines if the set/modify parameter handler sub-procedure is running (436). If the set/modify parameter handler sub-procedure is not running, the next drive after the currently selected drive in a predetermined list of drives becomes the current drive (438). The list of drives corresponds to a list of sets of programmable parameters from the plurality of programmable parameters. Generally, the list of drives is advanced through in a continuous loop so that the selected drive advances incrementally from the first drive to the last drive and the first drive follows the last drive. The list of drives and programmable parameters will be displayed to the user according to the view/scan option that was selected during calibration. At 440, the selected drive identified on the display is updated to reflect the newly selected drive and the sub-procedure returns to 434. Notably, the drive select monitor sub-procedure is repeated until the procedure ends.

At 436, if the set/modify parameter handler sub procedure is running, the next drive after the currently selected drive becomes the current drive (442). Next, a current value for the selected programmable parameter associated with then new current drive is retrieved (444). At 446, the selected drive identified on the display is updated to reflect the newly selected drive, the current value of the selected programmable parameter on the display is updated to reflect the current value associated with the newly selected drive, and the sub-procedure returns to 434.

Calibration Menu

Figure 25:
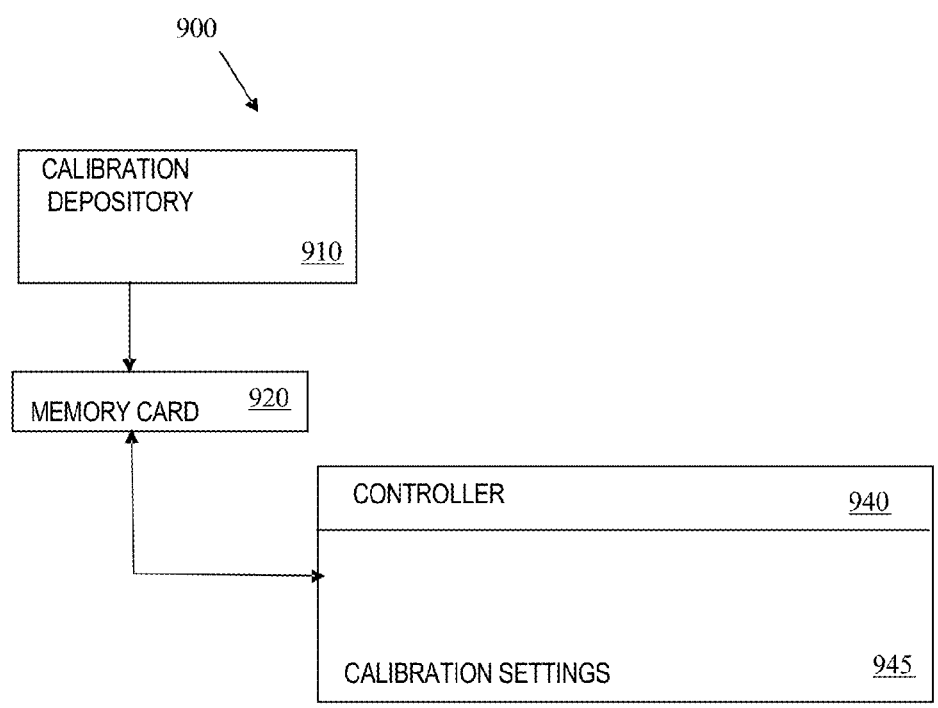
FIG. 25 is a schematic block diagram of a calibration file transfer system associated with setting or modifying programmable parameters associated with operation and support of a power driven wheelchair.

FIG. 25 is a functional block diagram that depicts one exemplary calibration setting transfer system 900 that can be used to transfer calibration settings between a remote calibration depository 910 and a wheelchair controller. To download calibration settings for use with a wheelchair, a memory card 920, or other portable storage media, is placed in operative communication with the calibration depository 910. After storing the desired settings from the calibration depository, the memory card is placed in operative communication with the controller 940 and the calibration settings are transferred to the portion of controller memory 945 that stores calibration settings. Likewise, calibration settings from controller memory 945 can be stored on the memory card 920 and used to restore settings to a wheelchair that has lost the settings due to a malfunction or to transfer the settings to another wheelchair when that is desirable. The settings stored on the memory card can then also be transferred to the calibration setting depository for later retrieval.

Referring now to FIG. 26, the calibration menu 292 and corresponding sub-menus that can be selected from the calibration menu are shown. The menu navigation, parameter selection and update processes described above apply to this menu as well. Two calibration options will be described in detail here, the mono port option and the view/scan option. The other calibration options are set out in detail in the patents and applications referenced in the cross reference section above and will be briefly described herein.

The mono port 1 and mono port 2 function assignment options 501, 502 allow the user to assign one of three functional modes to each of two virtual mono inputs created by a stereo input shown FIG. 8 as 123. Using a "Y" connector that routes two mono inputs into a single stereo input, either mono input can be assigned as an actuator control input, a drive select input or a mode select (reset) input by selecting the corresponding option from displays 501, 502. Alternatively, if a mono input jack is used in the stereo port 123, a single function, assigned to mono port 1, can be implemented.

Figure 27:
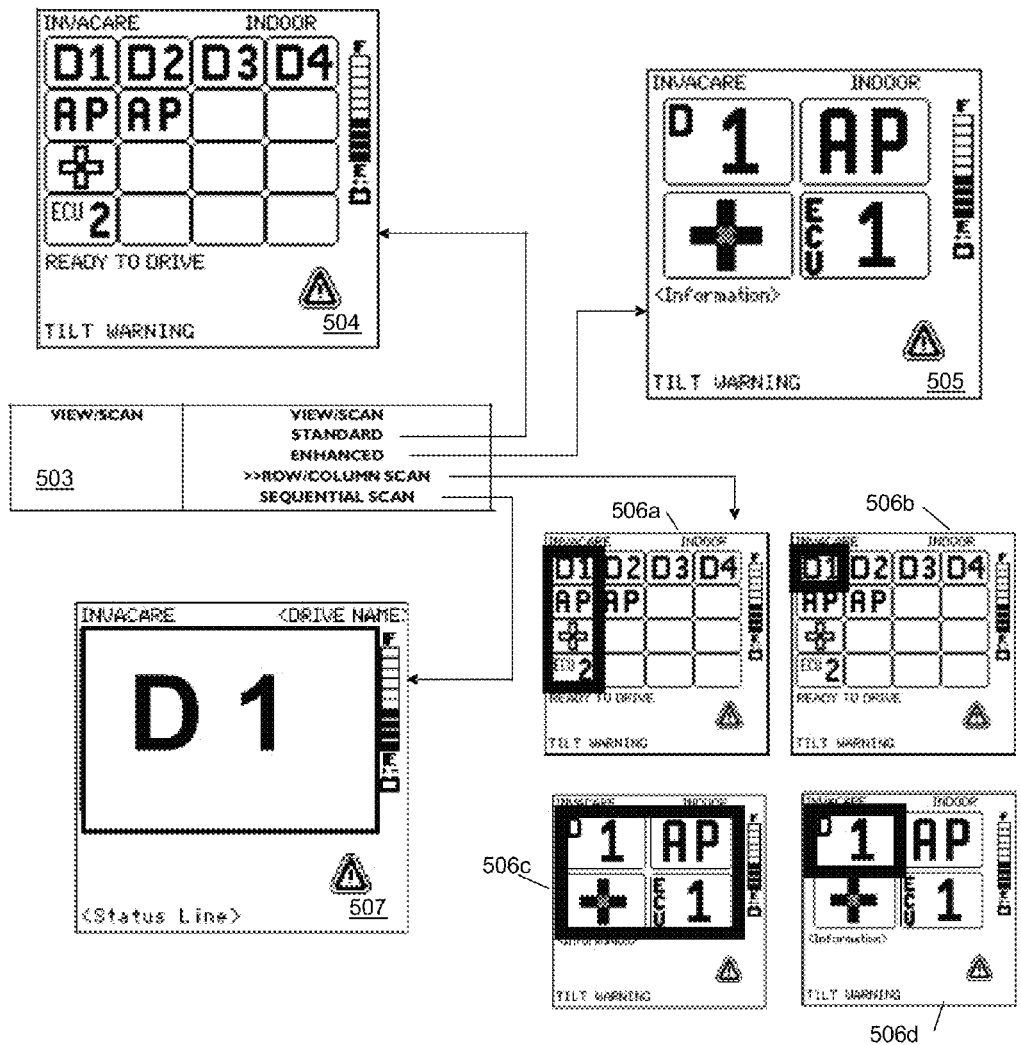

Referring now to FIG. 27, a view/scan sub menu 503 is used to access a sequence of displays. This sub menu is used to set a convention according to which parameter sets for each drive setting are displayed to the user. If the standard view option is selected, the drive information is displayed in standard grid form 504. If the enhanced view option is selected, the active drive is shown in an expanded view display 505, which may be helpful to those with impaired sight. Scanning views are also possible if either the row/column scan or sequential scan are selected. Scanning provides a convenient way for users who have difficulty activating the typical input controls to navigate through the drive select menu without having to actuate an input means for each progression through the menu. For example, if the display is placed in the row/column scan mode, when the user initiates the scan feature, the columns of the drive select grid are highlighted one at a time in sequence as shown by reference number 506a. The sequence may repeat a few times and at any point in the scanning sequence any input from the driver selects the currently highlighted column. Once a column has been selected, another driver input causes the individual icons in the column to be highlighted one at a time in sequence as shown by reference number 506b. Alternatively, the display can be set to display the drives as shown by reference numbers 506c and 506d in which a single drive grid is shown at a time until selected and then the icons in the selected grid are sequentially highlighted until one of the icons is selected. The display may also be placed in a sequential scan mode so that when the user requests the scan feature, the active drive and its icons are displayed one at a time as shown in display 507. The sequential mode allows a user to pinpoint a single icon using only two input activations and also provides a enlarged view that may be of the icon that may be of benefit to those with impaired sight. Other display related calibration settings are shown in the chart in FIG. 28, specifically, "init" time and repeat time. The init time setting determines the amount of time a wheelchair will remain in an active mode before scanning is reinitiated. The repeat time setting determines the amount of time the scanning screen will dwell on a highlighted item before moving to the next item.

Figure 28:

FIGS. 28 and 29 are charts listing various calibration parameters that can be set and/or transferred from portable storage media. The second column of the chart shows an exemplary display that can be displayed on the controller for assistance in calibration. A system name option allows a filename for the set of calibration parameters to be selected. This filename will be used to identify the calibration settings when they are transferred. A battery level option allows a user to calibrate the level display with an actual voltage level at the battery's terminals. A drive configuration option allows a user to select between rear wheel drive or center wheel drive. A motor balance option allows the user to vary the relative power received by each of the drive motors to compensate for variations in motor performance. A brake time out option allows the user to set a time delay between when the driver input is set to neutral and activation of an electro-magnetic motor lock. The power on option allows the user to select which drive mode the wheelchair will enter on power up, the user may also set the controller to cause the wheelchair to power up into the same mode it was in when power was shut off. The sip/puff option allows a user to set threshold and/or range of pressures for soft and hard puff and sips that will be used to operate the wheelchair. The tilt calibrate allows the user to correlate displayed angles to actual pitch angles on wheelchair components controlled by the actuator being calibrated.

Diagnostics Menu

Figure 30:
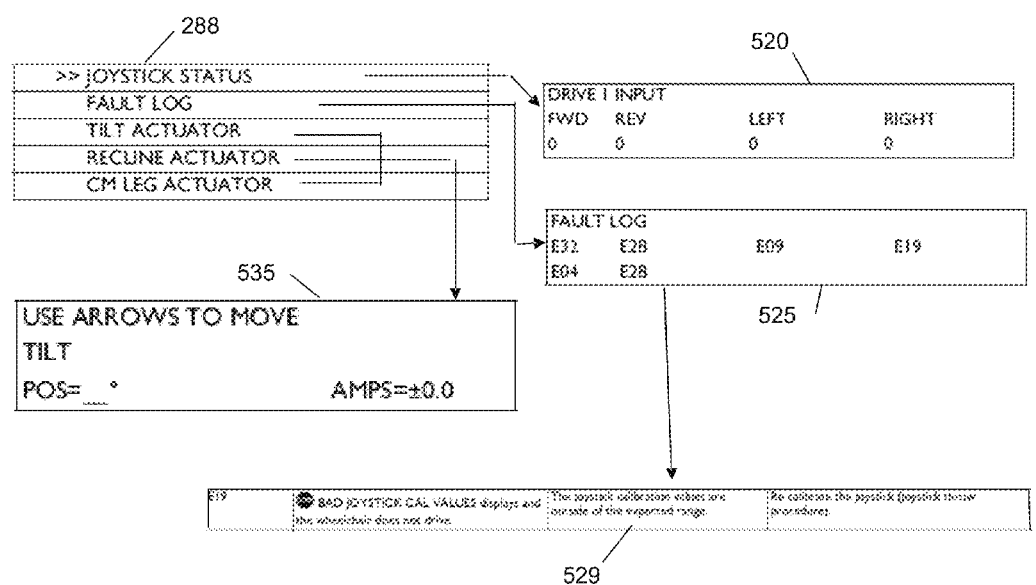
FIG. 30 is an exemplary display screen associated with diagnosing and troubleshooting components associated with a power driven wheelchair.

To access the diagnostic information display system, an advanced diagnostics sub menu 288 (also shown in FIG. 18) is selected that provides access to a series of displays is shown in FIG. 30. A joystick status option causes a joystick screen 520 to be displayed that displays the joystick throw settings for each quadrant when the joystick is being moved. The tilt, recline, and CM leg actuator options bring up an actuator screen 535 when selected. The actuator screen shows a present position and electrical current draw of the selected actuator as the actuator being moved. A fault log option causes a fault log of the most recent twelve fault codes that were logged to on board memory to be displayed. According to an advanced diagnostic feature, the user can navigate through the fault log and highlight a selected fault code. Activation of the info button will cause diagnostic and troubleshooting information 529 to be displayed on the display. This diagnostic and troubleshooting information is stored in on board memory and also can be stored on the portable storage media. In this manner, updated lists of fault codes and diagnostic information can be downloaded to the on board memory (see FIGS. 6 and 7). In addition to joystick diagnostics, an example of which is shown in FIG. 25, diagnostic information for other wheelchair components such as the electrical system including batteries and motors, brakes, electronics and controller is stored for display upon activation of the info button during operation in the diagnostic mode.

Figure 31:
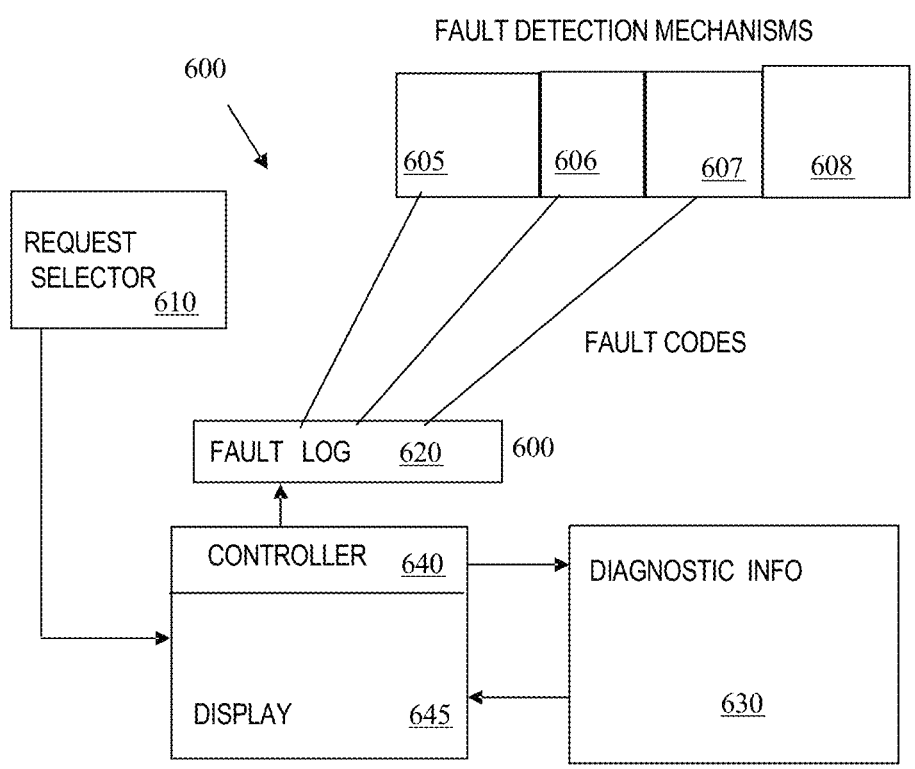
FIG. 31 is a block diagram schematically outlining a diagnostic information display system associated with operation and support of a power driven wheelchair.

Referring to FIG. 31, a block diagram of a diagnostic information display system 600 that can be used with a power driven wheelchair is shown. A controller 640 includes a display 645 on which fault codes and text messages can be displayed. The controller may be an on-board wheelchair controller or any remote computing device that is capable of displaying fault codes and text. Various fault detecting mechanisms 605, 606, 607, 608 associated with wheelchair components such as a joystick, brakes, seat actuator, and controller, respectively provide fault codes to a fault log 620 that stores the codes, for example, in chronological order. The controller can access the stored fault codes and display them on the display when this option is selected from the advanced diagnostics menu, described in more detail below. A collection of diagnostic information 630 can be stored in memory associated with the controller or any other memory source, such as portable storage media that can be inserted into the wheelchair controller as described above. The stored information includes text messages that convey possible causes for an associated fault code and/or troubleshooting information associated with the fault code. The stored information may be updated periodically as described above in connection with FIGS. 6 and 7. When the display is displaying a fault code, the user may select the fault code and request further information by actuating a request selector 610 such as, for example, an information button on the controller. When the controller receives the request for further information, it retrieves the stored text from the collection 630 and displays it on the display.

Figure 32:
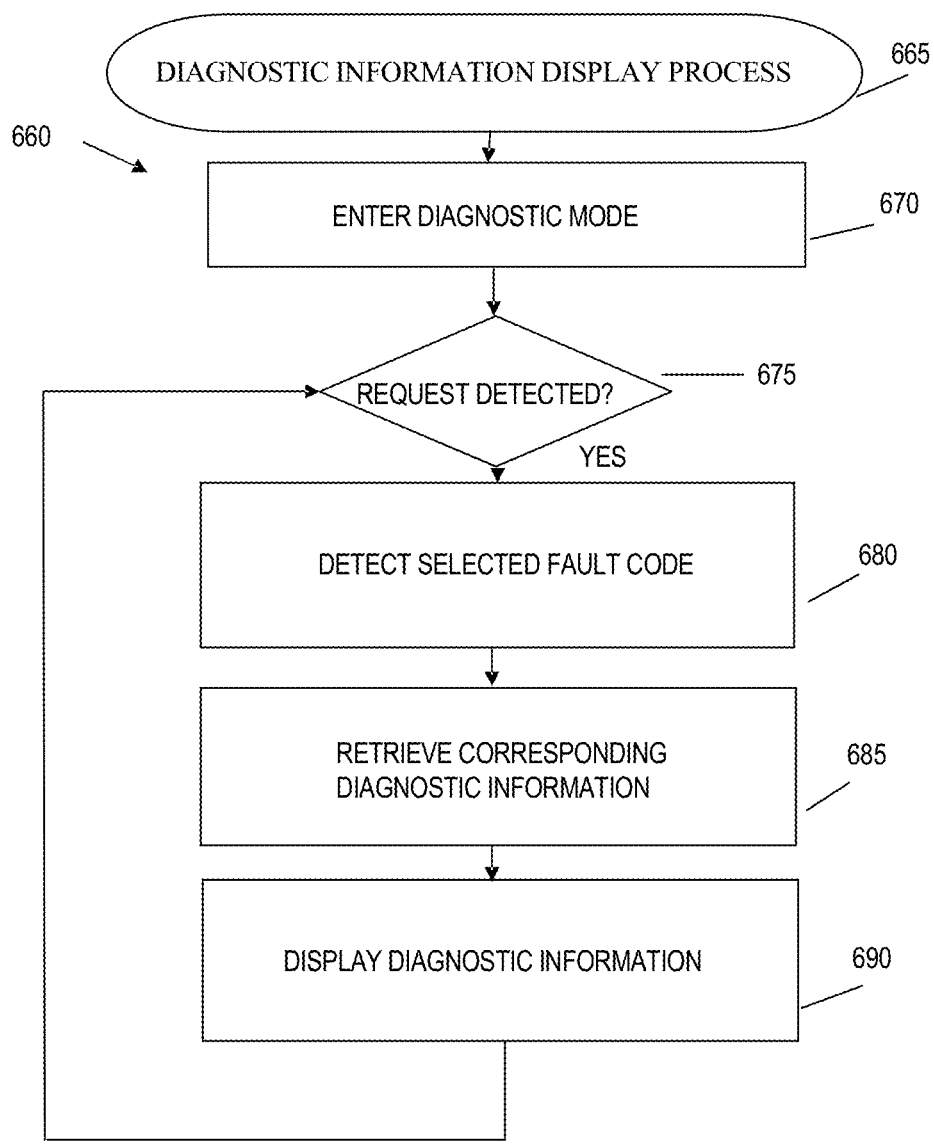
FIG. 32 is a flow chart of an exemplary diagnostic information display sub-process associated with operation and support of a power driven wheelchair.

FIG. 32 outlines one procedure for displaying diagnostic information 660. At 665, the procedure begins. At 670, the diagnostic mode is entered as described in more detail below. At 675, when a request is detected, the selected fault code is detected at 680 and corresponding diagnostic information is retrieved at 685. At 690 diagnostic information is displayed.

FIG. 33 is a chart that shows exemplary text and iconic messages that can be displayed by the advanced diagnostic feature. As described above, the text may be displayed when an error or warning code is selected from a displayed fault code log and a request for diagnostic information is received. Error codes E01-E04 indicate that the joystick or input device is sending a value outside of the acceptable range. Error codes E09 and E10 indicate that parking brakes are not operating. Error code E14 indicates that the battery needs to be charged. Error code E18 indicate that the joystick has failed the neutral test. Error code E19 indicates that the joystick calibration values are out of range. Error code E28 indicates that the battery charger is connected to the wheelchair. Error code E32 indicates that joystick is disconnected. Error code E41 indicates that the controller has experienced a fault. Error code E200 indicates that the display module is not communicating with the control module. Warning codes W01 and W03 indicate that the tilt angle of the wheelchair has exceeded the limit. Warning code W02 indicates that the wheelchair back has reached a maximum allowable recline angle. Warning code W04 indicates that the elevating seat is elevated. Warning code W05 indicates that the attendant control function is active.

While the method and apparatus have been described herein above in connection with one or more embodiments, it is understood that such description is presented by way of example with no intent of limiting the method and apparatus in any way.

We claim:

1. A method associated with a power driven wheelchair, comprising:
storing a parameter set on a portable storage medium, wherein the parameter set comprises parameters associated with operation of the power driven wheelchair;
coupling the portable storage medium to a first controller associated with a first power driven wheelchair, wherein the first controller comprises a first local storage device to store parameter sets; and
selectively transferring the parameter set from the portable storage medium to the first local storage device.

2. The method of claim 1 wherein storing the parameter set on the portable storage medium comprises uploading the parameter set from a second local storage device associated with a second power driven wheelchair to the portable storage medium.

3. The method of claim 2 wherein the parameter set comprises a customized parameter set for a user of the second power driven wheelchair.

4. The method of claim 1 wherein the portable storage medium comprises a plurality of parameter sets for selective transfer to power driven wheelchairs.

5. The method of claim 4 wherein the plurality of parameter sets comprises a master copy of parameter sets.

6. The method of claim 1 wherein storing the parameter set on the portable storage medium comprises accessing the parameter set from a library of parameter sets stored in a non-volatile storage media remotely located with respect to the power driven wheelchair.

7. The method of claim 1 wherein storing the parameter set on the portable storage medium comprises accessing the parameter set via a web page on the Internet.

8. The method of claim 1, further comprising coupling the portable storage medium to a computing device and transferring the parameter set from the computing device to the portable storage medium for transfer to the first local storage device.

9. The method of claim 1, further comprising associating a version number with the parameter set and wherein selectively transferring the parameter set from the portable storage medium to the first local storage device comprises comparing the version numbers associated with the parameter set stored on the portable storage medium and a parameter set previously stored in the first local storage device.

10. The method of claim 9 wherein selectively transferring the parameter set from the portable storage medium to the first local storage device only occurs if the version number of the parameter set stored on the portable storage medium indicates a more recent version than the version number associated with the parameter set previously stored in the first local storage device.

11. The method of claim 1, further comprising displaying a prompt that invites a user to manually initiate the transfer of the parameter set from the portable storage medium to the first local storage device.

12. An apparatus associated with a power driven wheelchair comprising:

a first controller associated with a first power driven wheelchair, wherein the first controller comprises a first local storage device for storing a parameter set, wherein the parameter set comprises parameters associated with operation of the power driven wheelchair; and a first storage medium interface associated with the first controller for interfacing with a portable storage medium that can store the parameter set for transfer from the portage storage medium to the first local storage device when the portable storage medium is coupled to the storage medium interface.

13. The apparatus of claim 12, further comprising:

a second controller associated with a second power driven wheelchair, wherein the second controller comprises a second local storage device for storing the parameter set; and a second storage medium interface associated with the second controller for interfacing with the portable storage medium that can store the parameter set for transfer from the second local storage device to the portable storage medium when the portable storage medium is coupled to the second storage medium interface.

14. The apparatus of claim 13 wherein the parameter set comprises a customized parameter set for a user of the second power driven wheelchair.

15. The apparatus of claim 12 wherein the portable storage medium comprises a plurality of parameter sets for selective transfer to power driven wheelchairs.

16. The apparatus of claim 15 wherein the plurality of parameter sets comprises a master copy of parameter sets.

17. The apparatus of claim 12 wherein the portable storage medium is a secure digital card.

18. The apparatus of claim 12, further comprising a computing device configured to access and store parameter sets that are stored on a web page, and wherein the computing device can be selectively placed in operative communication with the portable storage medium.

19. The apparatus of claim 12, further comprising a non-volatile storage media that stores a parameter set library that includes one or more parameter sets, and wherein the portable storage medium can be selectively placed in operative communication with the parameter set library.

20. The apparatus of claim 12, further comprising a display, wherein the display displays a prompt that invites a user to manually initiate the transfer of the parameter set from the portable storage medium to the first local storage device.

21. The method of claim 3 wherein the customized parameter set is associated with impairments common to the user of the second power driven wheelchair and a user of the first power driven wheelchair.

22. The apparatus of claim 14 wherein the customized parameter set is associated with impairments common to the user of the second power driven wheelchair and a user of the first power driven wheelchair.

* * * * *